US006918089B2

(12) United States Patent
Uchida et al.

(10) Patent No.: US 6,918,089 B2
(45) Date of Patent: Jul. 12, 2005

(54) SCHEDULE MANAGEMENT SYSTEM

(75) Inventors: Jiyunji Uchida, Minato-ku (JP);
Yoshinobu Hara, Minato-ku (JP);
Shinya Itou, Minato-ku (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 487 days.

(21) Appl. No.: 09/900,591

(22) Filed: Jul. 5, 2001

(65) Prior Publication Data
US 2002/0077879 A1 Jun. 20, 2002

(30) Foreign Application Priority Data
Jul. 11, 2000 (JP) ........................................ 2000-209315

(51) Int. Cl.[7] .............................................. G09G 5/00
(52) U.S. Cl. ............................ 715/751; 715/963; 705/8
(58) Field of Search ................................ 345/733, 738, 345/751, 963; 705/3, 8, 9; 717/101, 103

(56) References Cited

U.S. PATENT DOCUMENTS

| 4,162,610 | A |   | 7/1979 | Levine |         |
|-----------|---|---|--------|--------|---------|
| 5,317,699 | A |   | 5/1994 | Sugita et al. |  |
| 5,530,861 | A | * | 6/1996 | Diamant et al. | 705/8 |
| 5,548,506 | A | * | 8/1996 | Srinivasan | 705/8 |
| 5,765,140 | A | * | 6/1998 | Knudson et al. | 705/9 |
| 5,767,848 | A | * | 6/1998 | Matsuzaki et al. | 345/751 |

(Continued)

FOREIGN PATENT DOCUMENTS

| JP | 04-069136 |   | 3/1992 |
|----|-----------|---|--------|
| JP | 5006378   |   | 1/1993 |
| JP | 07-282129 | * | 10/1995 |
| JP | 8305749   |   | 11/1996 |
| JP | 9174392   |   | 7/1997 |
| JP | 10-155745 | * | 6/1998 |
| JP | 11-031179 | * | 2/1999 |
| JP | 11031179  |   | 2/1999 |
| JP | 11232323  |   | 8/1999 |
| WO | WO 97/16911 |   | 5/1997 |
| WO | WO 01/30010 A2 |   | 4/2001 |

OTHER PUBLICATIONS

Matsudaira, Takayuki, et al.; Global Engineering Environment For Design Information; Toshiba Review; Sep. 1999; pp. 52–55; vol. 54, No. 9.

Nisino, Yoshinori, et al.; Implementation Of CAD Data Management System With A Workflow Function Handling The Life–Cycle Of Data In Distributed Environments And Its Verification; Transactions Of Information Processing Society Of Japan; Nov. 1999; pp. 3906–3913; vol. 40, No. 11.

(Continued)

Primary Examiner—Raymond J. Bayerl
Assistant Examiner—Ting Zhou
(74) Attorney, Agent, or Firm—Fenwick & West LLP

(57) ABSTRACT

A schedule management system in a managing party connects via a network to one or more managed parties. The system comprises a schedule table for storing a schedule created by the managing party. The created schedule is transferred to a common schedule table provided on a server. The server is provided outside the managing party. The system provides each of the managed parties with an inquiry means for inquiring the schedule stored in the common schedule table. When the schedule stored in the schedule table is modified for some reasons, the modified schedule is transferred to the common schedule table. Thus, the managed party can view the latest schedule. Furthermore, each of the managed parties transfers modification data via the modification means. The system modifies the schedule stored in the schedule table with the received modification data. The system further displays the progress in a hierarchical format. The system compares the progress data with the schedule and displays the progress by a mark assigned in accordance with the comparison result.

21 Claims, 26 Drawing Sheets

U.S. PATENT DOCUMENTS

| | | | | |
|---|---|---|---|---|
| 5,960,406 | A | | 9/1999 | Rasansky et al. |
| 6,049,776 | A | | 4/2000 | Donnelly et al. |
| 6,101,481 | A | * | 8/2000 | Miller .......................... 705/9 |
| 6,353,447 | B1 | * | 3/2002 | Truluck et al. ............. 345/733 |
| 6,587,831 | B1 | * | 7/2003 | O'Brien ........................ 705/8 |
| 6,647,448 | B1 | * | 11/2003 | Brelin ........................ 710/107 |

OTHER PUBLICATIONS

"A Real Time Sharing Control System for Multimedia Data on the Internet", DICOMO 2000 Thesis, vol. 2000, No. 7, pp. 265–170.

Maruyama, N., et al., "WebEDI System for Material Procurement Operations", vol. 67, No. 2, pp. 51–55.

* cited by examiner

FIG. 4A Basic Schedule Record
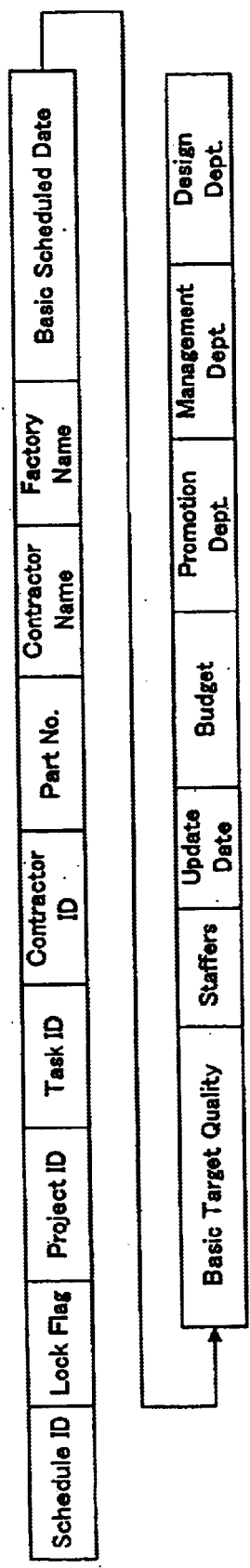
FIG. 4B Basic Scheduled Date field
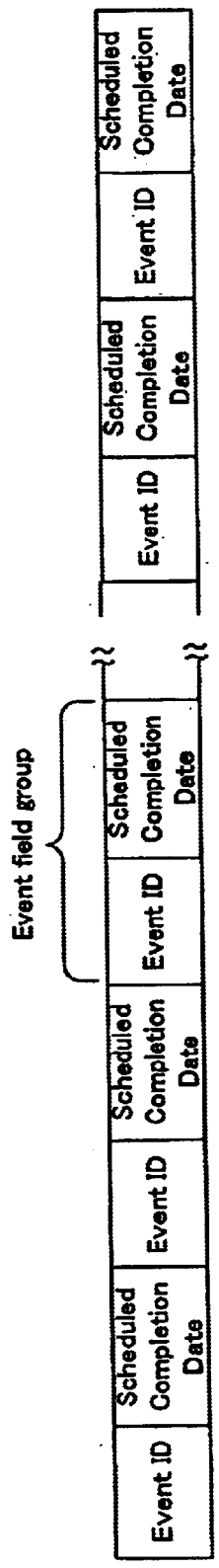

FIG. 4C Basic Target Quality field
FIG. 4D Budget field
FIG. 4E Department field

FIG. 5

| Quality Code | Quality criteria |
|---|---|
| T1 | Basic shape can be identified. It is not available as parts. |
| T2 | It is available as parts from the viewpoint of formability and accuracy. |
| T3 | A little trouble exist. Mass production is possible from the viewpoint of quality. |
| T4 | Mass production is actually possible. |

FIG. 6A  Progress Data Record

| Schedule ID | Project ID | Task ID | Contractor ID | Part No. | Contractor Name | Factory Name | Achieved Date |
|---|---|---|---|---|---|---|---|

| Achieved Quality | Achieved Cost | Staffers | Update Date |
|---|---|---|---|

FIG. 6B  Achieved Date field

{ Event field group }

| Event ID | Achieved Completion Date | Comment | Event ID | Achieved Completion Date | Comment |
|---|---|---|---|---|---|

FIG. 6C  Achieved Quality field

| Event ID | Achieved Quality Code | Comment | Event ID | Achieved Quality Code | Comment |
|---|---|---|---|---|---|

FIG. 6D  Achieved Cost field

| 1st | | | 2nd | |
|---|---|---|---|---|
| Cost | Comment | | Cost | Comment |

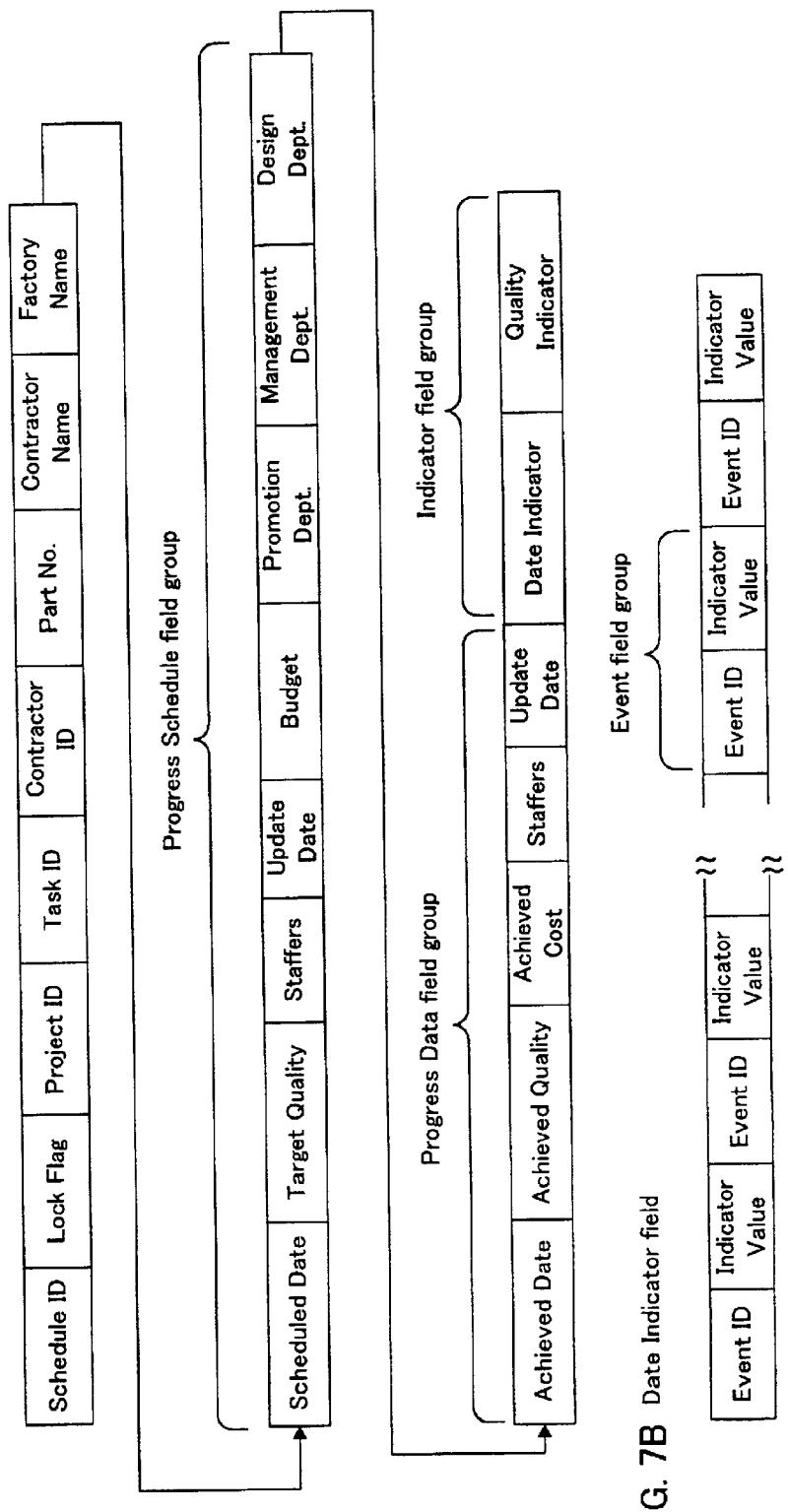

FIG. 8

| Value | meaning | display |
|---|---|---|
| 00 | Initial Value | nothing |
| 10 | Ahead | Green Lamp |
| 01 | Behind | Red Lamp |
| 11 | No Progress Data | Bomb |

FIG. 9A

| S101/01 | 1 | A100 | A101 | 11111 | PART001 | E1 | 000606 | E2 | 000906 | ≈ ≈ | E1 | T1 | E2 | T2 |

First Progress Schedule

| E1 | 000601 | E2 | ≈ ≈ | E1 | T1 | E2 |

Progress Data

| E1 | 10 | E2 | ≈ ≈ | E1 | 10 | E2 |

Indicator

FIG. 9B

| S101/02 | 0 | A100 | A101 | 11111 | PART001 | E1 | 000606 | E2 | 001006 | ≈ ≈ | E1 | T1 | E2 | T2 |

Second Progress Schedule

| E1 | 000601 | E2 | 001010 | ≈ ≈ | E1 | T1 | E2 |

Progress Data

| E1 | 10 | E2 | 01 | ≈ ≈ | E1 | 10 | E2 | 11 |

Indicator

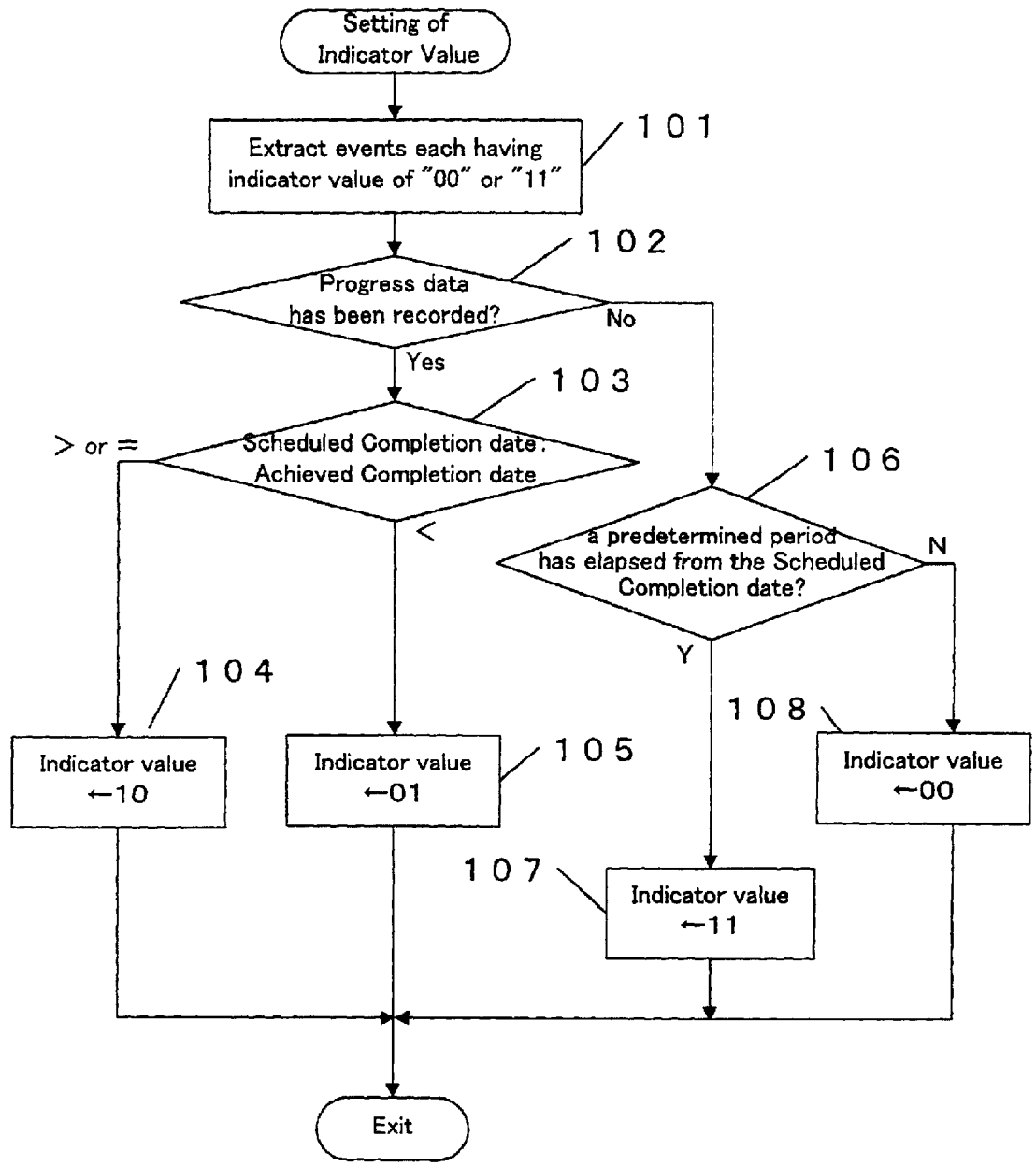

FIG. 14

Inquiry of Schedule

Project:A (Project ID:A100) Contractor ID:111111 Part No.:PART0001
Task:A (Task ID:A101)    Name :xx Co., Ltd.    Factory Name:TOKYO01

|  |  | E1 | E2 | E3 | E4 | E5 |
| --- | --- | --- | --- | --- | --- | --- |
| S101 | Date | 00/06/06 | 00/09/06 | 00/11/06 | 01/01/15 | 01/03/01 |
|  | Quality | T1 | T2 | T3 | T3 | T4 |
| S101/01 | Date | 00/06/06 | 00/09/06 | 00/11/06 | 01/01/15 | 01/03/01 |
|  |  | 00/06/01 |  |  |  |  |
|  | Quality | T1 | T2 | T3 | T3 | T4 |
|  |  | T1 |  |  |  |  |
| S101/02 | Date | 00/06/06 | 00/10/06 | 00/11/06 | 01/01/15 | 01/03/01 |
|  |  | 00/06/01 | 00/10/10 |  |  |  |
|  | Quality | T1 | T2 | T3 | T3 | T4 |
|  |  | T1 |  |  |  |  | to Update screen
Upload

Project:A (Project ID:A100) Contractor ID:111111 Part No.:PART0002

FIG. 16

Inquiry of Schedule

Contractor ID: 111111
Name: xx Co., Ltd.

Project A (Project ID: A100)  Task A (Task ID: A101)    to Modification screen    to Progress Data Input screen
Part No.: PART0001  Factory Name: TOKYO01

Basic Schedule S101  Date    E1          E2          E3          E4          E5
                              00/06/06    00/09/06    00/11/06    01/01/15    01/03/01
                     Quality  T1          T2          T3          T3          T4

Project A (Project ID: A100)  Task A (Task ID: A102)    to Modification screen    to Progress Data Input screen
Part No.: PART0002  Factory Name: TOKYO01

Basic Schedule S102  Date    E1          E2          E3          E4          E5
                              00/06/06    00/10/06    00/11/06    01/01/15    01/03/01
                     Quality  T1          T2          T3          T3          T4

Inquiry of Schedule

Contractor ID: 111111
Name: xx Co., Ltd.

Project A (Project ID: A100)  Task A (Task ID: A101)    to Modification screen    to Progress Data Input screen
Part No.: PART0001  Factory Name: TOKYO01

● Basic Schedule S101         Date     00/06/06   00/09/06   00/11/06   01/01/15   01/03/01
                              Quality  E1         E2         E3         E4         E5
● Progress Schedule S101/01   Date     00/06/06   00/09/06   00/11/06   01/01/15   01/03/01
                                       T1         T2         T3         T3         T4
                              Quality  E1         E2         E3         E4         E5
                              Date     00/06/01
                              Quality  T1         T2         T3         T3
                                       E1

Progress Schedule S101/02     Date     00/06/06   00/10/06   00/11/06   01/01/15   01/03/01
                                       T1         T2         T3         T3         T4
                              Quality  E1         E2         E3         E4         E5
                              Date                00/10/10
                              Quality  T1         T2

Project A (Project ID: A100)  Task B (Task ID: A102)    to Modification screen    to Progress Data Input screen
Part No.: PART0002  Factory Name: TOKYO01

Figure 22:
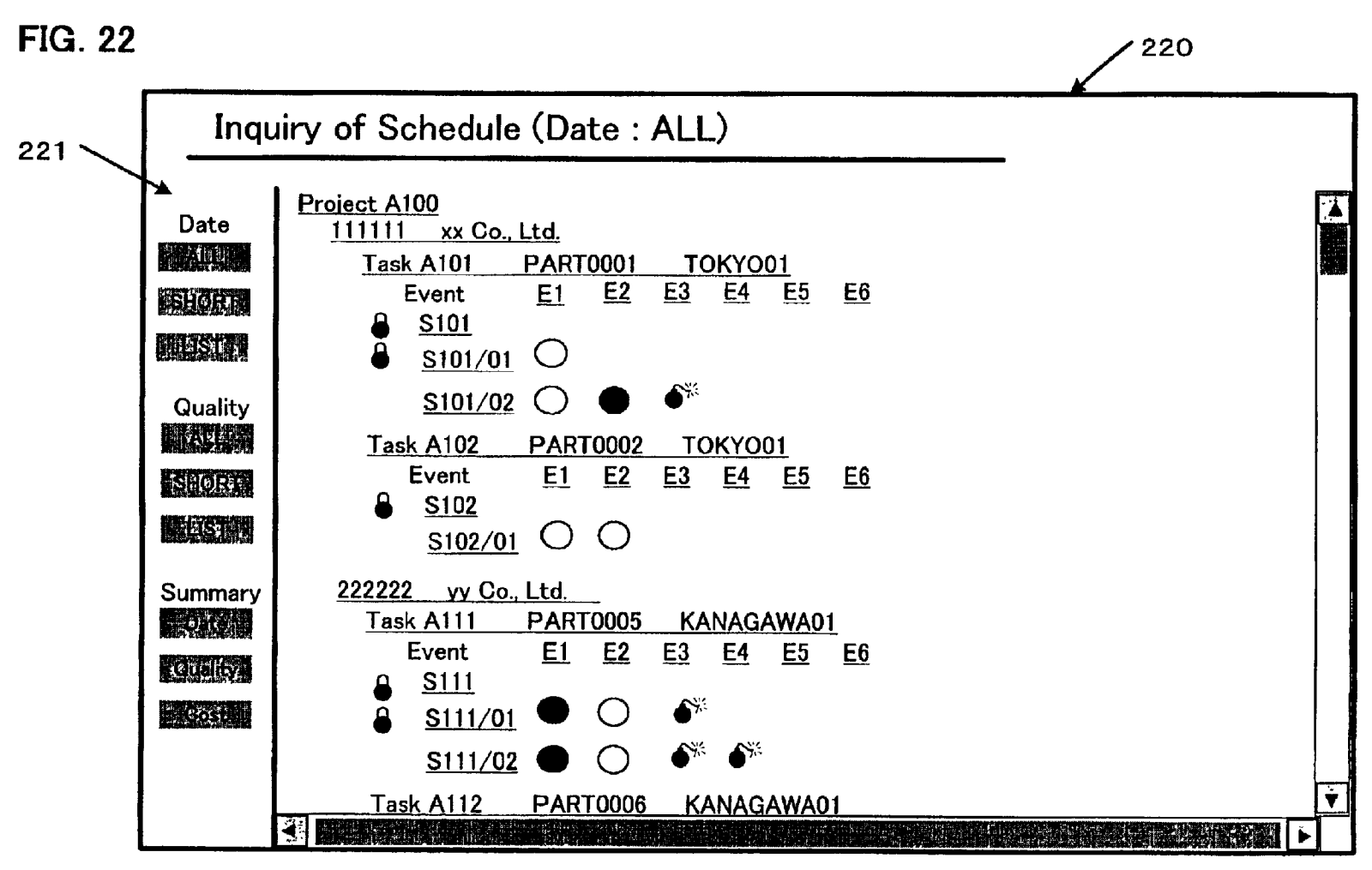

Inquiry of Schedule (Date : ALL)

Date
ALL
SHORT
BEST

Quality
ALL
SHORT
BEST

Summary
DAY
Quality
COST

Project A100
111111  xx Co., Ltd.
Task A101  PART0001  TOKYO01
Event     E1   E2   E3   E4   E5   E6
S101      ○    ●
S101/01
S101/02   ○    ●   💣

Task A102  PART0002  TOKYO01
Event     E1   E2   E3   E4   E5   E6
S102      ○
S102/01   ○

222222  yy Co., Ltd.
Task A111  PART0005  KANAGAWA01
Event     E1   E2   E3   E4   E5   E6
S111      ●
S111/01   ○
S111/02   ●        💣

Task A112  PART0006  KANAGAWA01
                         💣

FIG. 23

Inquiry of Schedule (Date : SHORT) — 230

Project A100
Task A101 PART0001 TOKYO01
  Event   E1  E2  E3  E4  E5  E6
  S101/02  ○   ●   ☀

Task A102 PART0002 TOKYO01
  Event   E1  E2  E3  E4  E5  E6
  S102/01  ○   ○

Task A111 PART0005 KANAGAWA01
  Event   E1  E2  E3  E4  E5  E6
  S101/02  ○   ●   ☀

Task A112 PART0006 KANAGAWA01
  Event   E1  E2  E3  E4  E5  E6
  S101/02  ●   ●   ☀

Task A112 PART0006 KANAGAWA02
  Event   E1  E2  E3  E4  E5  E6
  S101/02  ●   ○   ☀

Task A113 PART0007 TOKYO03

Date: ALL | SHORT | LIST
Quality: ALL | SHORT | LIST
Summary: DAY | QUALITY | COST

SCHEDULE MANAGEMENT SYSTEM

FIELD OF THE INVENTION

The present invention relates to a schedule management system for managing a work schedule efficiently by the use of a global network such as the Internet, and more particularly to the schedule management system for managing a schedule for work which is shared among a plurality of parties.

BACKGROUND OF THE INVENTION

A company who carries out one project may place orders with a plurality of contractors and/or suppliers for tasks of the project so that the project is shared among them. To manage the progress of the tasks assigned to the contractors, staffers in the company typically create a basic schedule for the project and present it to the contractors, for example by facsimile or postal mail. The contractors may modify the basic schedule as they believe appropriate and send the modified schedule back to the staffers.

After the project starts, the staffers in the company may inquire each of the contractors about progress. The inquiry is typically made by telephone, e-mail, or other means. The staffers record the obtained progress data in the schedule to check whether the schedule has been met.

According to the above-described method, it may be difficult to adjust a schedule between the company and the contractors, because the communication between them is carried out by facsimile, postal mail or e-mail. When the staffers make a modification to the schedule, the contractors may be unable to view the modified schedule in real time. Therefore, progress may be behind the schedule. Furthermore, collecting progress data from a plurality of correctors by telephone or e-mail is a heavy load. In particular, if a large amount of work is to be carried out by a plurality of contractors, it may be difficult to collect progress data and record it in a schedule quickly and accurately.

Japanese Patent Application Laid-Open No. 5-6378 describes a system for managing the schedule for work conducted by a plurality of members. Workstations of members are connected via a network. The workstation of each member includes a personal schedule management part. A coordinated schedule management part provided in a server manages the overall schedule of the work based on the personal schedule data obtained from each personal schedule management part. According to the system, collecting personal schedule data imposes a heavy load on the coordinated schedule management part.

Japanese Patent Application Laid-Open No. 11-31179 describes a method for managing the progress of a transaction. The method involves obtaining transaction data transferred through a network and creating a schedule based on the obtained transaction data, the schedule being represented by process stages and completion dates defined for a plurality of companies. When progress data is obtained, it is recorded in the schedule. If an actual completion date is behind the schedule, completion dates defined for the subsequent process stages are modified accordingly. According to the method, a managed party can not check on the schedule in real time. Therefore, it is difficult to adjust the schedule between the managing party and the managed party.

On the other hand, a typical schedule display format is a table in which the horizontal axis represents date and the vertical axis represents schedule items. When a schedule is created, a due date for each item is recorded in the table. When progress data is obtained, an actual completion date for each item is recorded in the table. The progress of work is managed item by item through the comparison of the due date and the actual completion date.

Japanese Patent Application Laid-Open No. 9-174392 discloses a system for generating a progress chart. Progress points indicating progress rates are plotted on a schedule line and progress check dates are plotted on a calendar line. A progress line is drawn connecting each progress check date and corresponding progress point. The progress chart visually shows the progress of work in which multiple tasks are carried out concurrently.

Japanese Patent Application Laid-Open No. 8-305749 describes an apparatus for creating a work plan based on a standard timetable pattern. The standard timetable pattern represents a correspondence between a standard timetable and standard man-hours for each work category. The apparatus displays the work plan and obtained progress data for each category in tabular form, the work plan and progress data being expressed in man-hours.

Japanese Patent Application Laid-Open No. 11-232323 describes a method for keeping track of the state of each room at a facility. According to the method, data relating to various events that have taken place at each room is displayed. For example, when a room is being cleaned, an indicator for the cleaning event is displayed. Thus, it is determined whether work as to each room is done in a proper manner.

According to the above-described display formats, it may be difficult to grasp at a glance which of items needs to be handled. Also, it may be difficult to identify a relationship among tasks. In particular, when a project comprises a plurality of tasks, it may be difficult to determine whether the progress for each task is behind or ahead of the schedule.

SUMMARY OF THE INVENTION

It is an object of the present invention to provide a schedule management system for making it easy to adjust a schedule between a managing party and managed parties.

It is another object of the present invention to provide a schedule management system for allowing a reliable schedule to be created.

It is another object of the present invention to provide a schedule management system for making it easy to collect progress data from a plurality of managed parties and record it in a schedule.

It is another object of the present invention to provide a schedule management system for displaying a schedule in such a way that the progress of work can be grasped at a glance.

According to one aspect of the present invention, a schedule management system provided in a managing party is connected to one or more managed parties via a network. The system comprises a schedule table for storing a schedule created by the managing party. The created schedule is transferred to a common schedule table provided on the network by a transfer means. The system provides each of the managed parties with an inquiry means for inquiring the schedule stored in the common schedule table. When the schedule stored in the schedule table is modified for some reasons, the modified schedule is transferred to the common schedule table. Thus, the managed party can view the latest schedule. Since the managing party and the managed party can view the same schedule in real time, the adjustment of a schedule is facilitated.

According to another aspect of the invention, the system further provides each of the managed parties with a modification means. The managed party transfers modification data via the modification means. In response to the receipt of the modification data, the system modifies the schedule stored in the schedule table with the received modification data. The transfer means is activated to transfer the modified schedule to the common schedule table. Thus, the reliability of a schedule is improved by the involvement of the managed parties.

According to one embodiment of the invention, the transfer of the schedule to the common schedule table is automatically activated when the modification to the schedule has been completed.

According to another aspect of the present invention, the management system further provides each of the managed parties with a progress input means. The managed party transfers progress data to the managing party via the progress input means. In response to the receipt of the progress data, the system records it in the schedule stored in the schedule table. The transfer means is activated to transfer the schedule where the progress data is recorded to the common schedule table. Since progress data is transferred from the managed party, collecting the progress data is facilitated.

According to one embodiment of the present invention, the common schedule table is provided in a server which is provided outside the system. The managed parties may access the common schedule table through the Internet. The managed party may also transfer the modification data and progress data to the managing party through the Internet.

According to another embodiment of the present invention, the inquiry and transfer of the schedule are performed via a browser which has the function of communicating with the Internet.

According to another aspect of the present invention, the schedule management system displays the progress in a hierarchical format in accordance with predetermined categories. For example, the system displays the progress in a hierarchical format having a project, tasks included in the project, and events included in each task in this order. The hierarchical display format facilitates grasping the progress.

According to one embodiment of the present invention, the progress data is compared with the schedule. The progress data is displayed by a mark assigned in accordance with the comparison result. Thus, it is possible to identify and deal with a delay of work quickly.

BRIEF DESCRIPTION OF THE DRAWINGS

FIG. 4 is a diagram showing an example of a data structure of a basic schedule database according to one embodiment of the present invention;

FIG. 5 is a diagram showing an example of quality standard codes according to one embodiment of the present invention;

FIG. 6 is a diagram showing an example of a data structure of a progress data receipt database according to one embodiment of the present invention;

FIG. 7 is a diagram showing an example of a data structure of a project schedule database according to one embodiment of the present invention;

FIG. 8 is a diagram showing an example of indicator values according to one embodiment of the present invention;

FIG. 9 is a diagram showing example values stored in a project schedule database according to one embodiment of the present invention;

FIG. 10 is a flowchart of setting an indicator value according to one embodiment of the present invention;

FIG. 14 is a diagram showing another example of the Schedule Inquiry screen provided to a managing party according to one embodiment of the present invention;

FIG. 16 is a diagram showing an example of a Schedule Inquiry screen provided to a managed party according to one embodiment of the present invention;

FIG. 19 is a diagram showing another example of the Schedule Inquiry screen provided to a managed party according to one embodiment of the present invention;

FIG. 22 is a diagram showing an example of a Schedule Inquiry screen provided to a managing party according to one embodiment of the present invention;

FIG. 23 is a diagram showing another example of the Schedule Inquiry screen provided to a managing party according to one embodiment of the present invention;

DETAILED DESCRIPTION OF THE PREFERRED EMBODIMENTS

Figure 1:
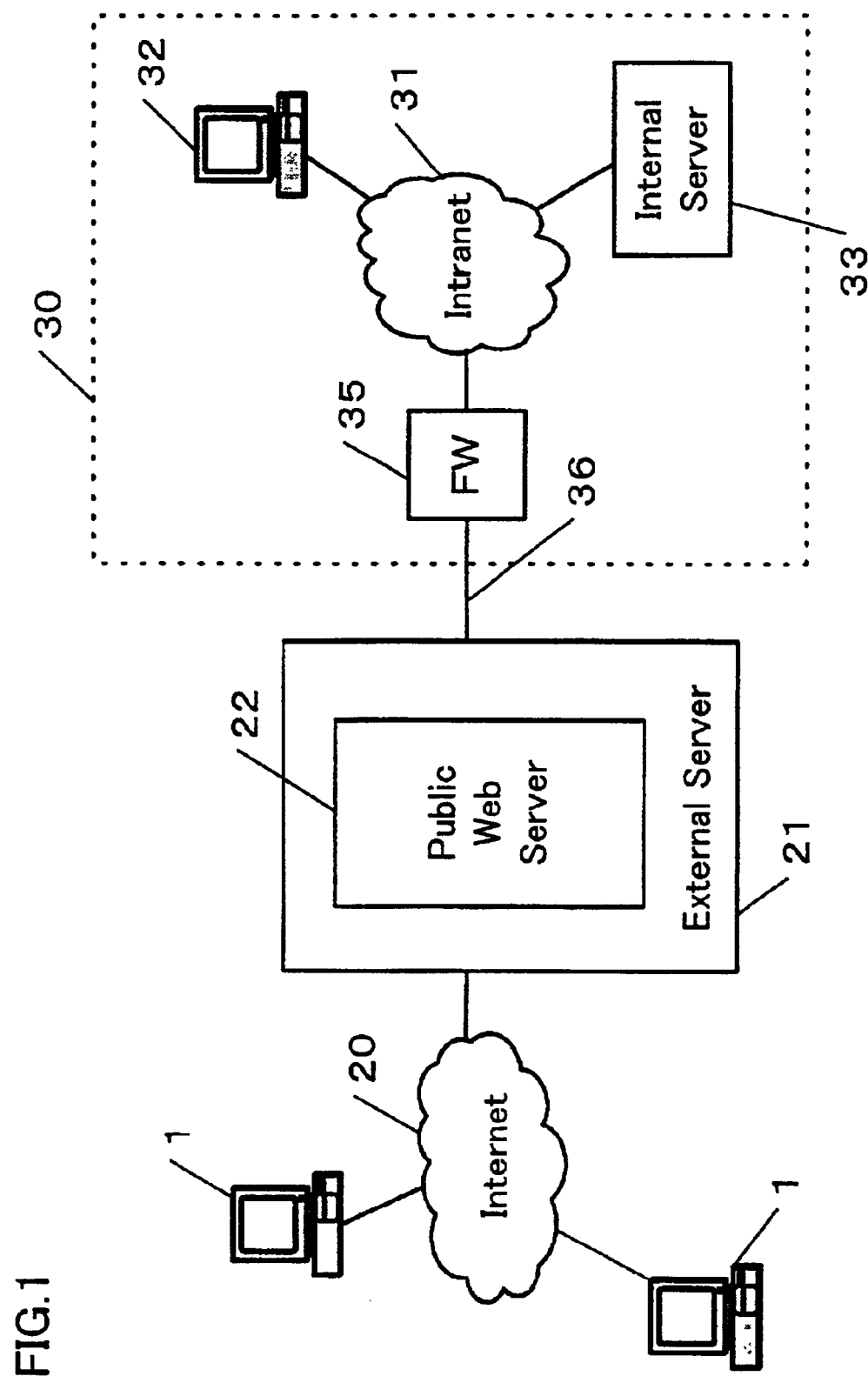
FIG. 1 is a block diagram showing overall network connection of a schedule management system according to one embodiment of the present invention.

Preferred embodiments of the present invention will be described with reference to the drawings. FIG. 1 shows general network connection of a schedule management system according to one embodiment of the present invention. A system 30 is provided in a company X. A plurality of personal computers 32 are connected to an Intranet 31 through a LAN provided in the company X. Each of the personal computers 32 can access an internal server 33.

The system 30 is connected to an external server 21 provided outside the company X via a firewall 35 and private line 36. The firewall is a router having the function of screening packets. The firewall selects a packet in accordance with data included in the header of the packet such as a source host address, a destination host address, and the type of protocol. In the present embodiment, the firewall 35 is configured to accept packets transferred from the external server 21 to the internal server 33 and to reject other incoming data.

The external server 21 is operated by a computer company. The external server 21 provides a user with a web site of the company X through the Internet 20 under contract with the company X. According to the present embodiment, the web site of the company X includes general pages such as a page for company's prospectus and an introduction of new products, and business pages for communicating with the company X's contractors. These pages are generated by the company X and are uploaded to a public Web server 22 from the internal server 33 by, for example, an FTP (File Transfer Protocol).

Access to the business pages is permitted to only contractors each having an ID (identification code) and a registered password authorized by the company X. For example, when a contractor 1 enters an URL address of a home page of the company X, the top page of the home page is displayed on a browser of the contractor's personal computer 1. The top page has a button for entering into business pages. When the button is clicked, the page having ID and password fields is displayed. The contractor 1 enters its ID and password in the respective fields, and clicks a transfer button. After that, encryption technology using an SSL (Secure Sockets Layer) is applied to data communication between the browser of the personal computer of the contractor 1 and the public Web server 22.

When the ID and password are transferred to the public Web server 22, an authentication process is performed. When it is determined that the contractor is authentic, the HTML document of a main page of the business pages is transferred to the browser of the contractor 1. Since the transmission and authentication technology in the Internet are well known, the technology will not be discussed in further detail herein.

Figure 2:
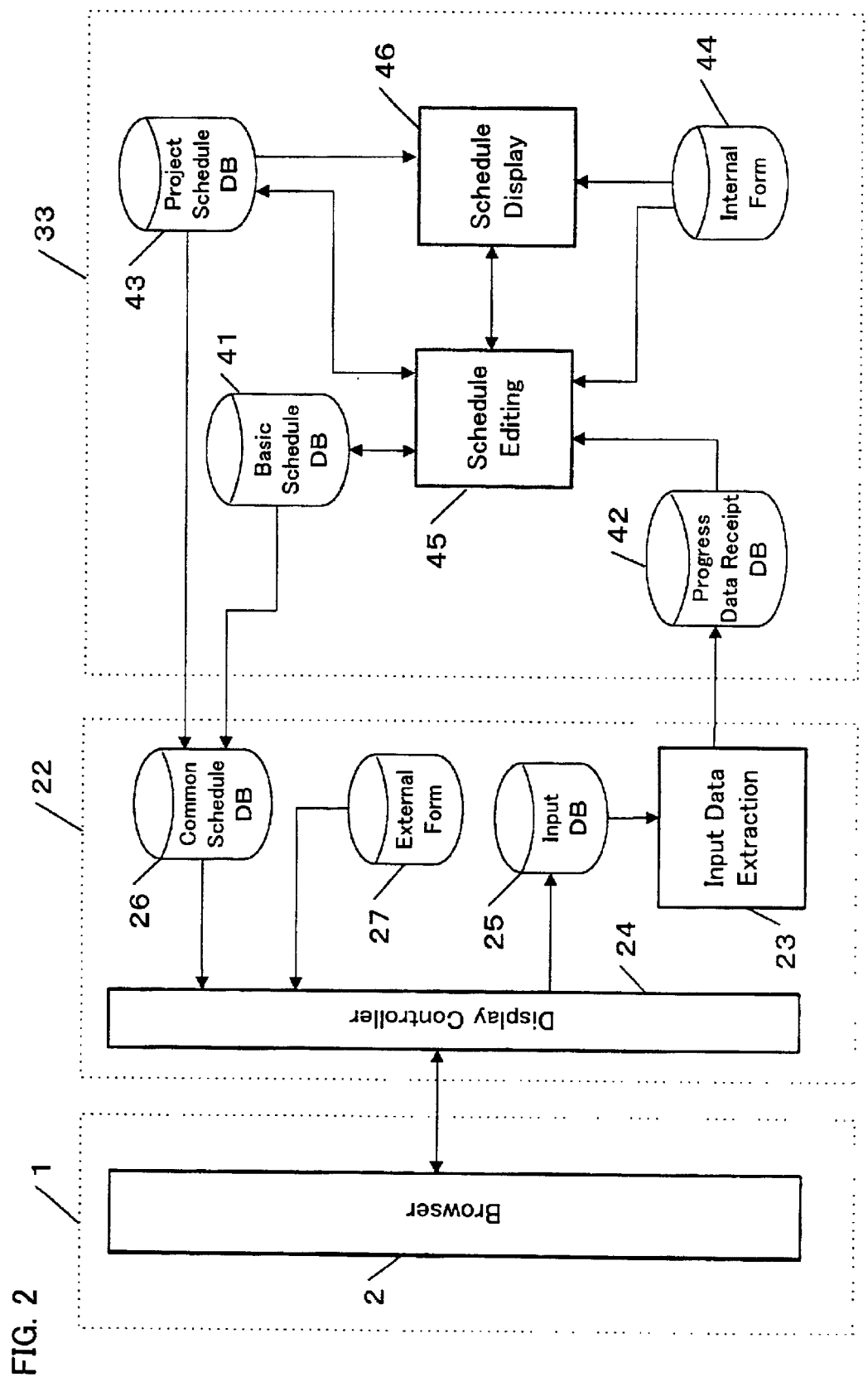
FIG. 2 is a functional block diagram of a schedule management system according to one embodiment of the present invention.

FIG. 2 is a functional block diagram showing a schedule management system according to one embodiment of the present invention. It is assumed that company X divides a project into a plurality of tasks and assigns the tasks to a plurality of contractors. Therefore, the project is carried out by the coordination of the contractors. The schedule management system according to the present invention creates a schedule for each of tasks assigned to each contractor, and manages the progress of each task.

Figure 3A:
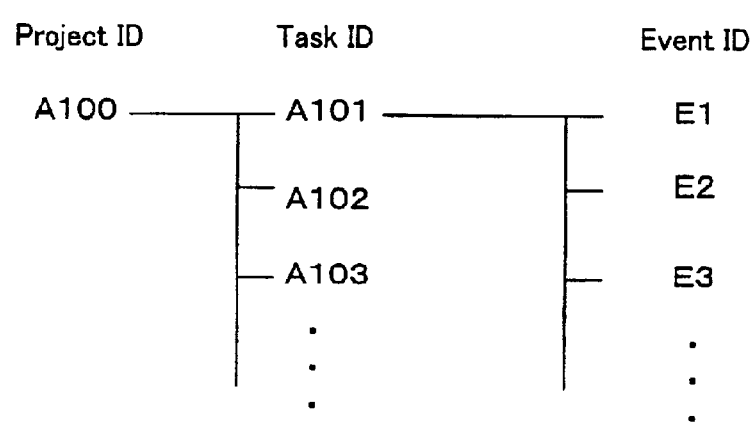
FIG. 3 is a diagram showing a code scheme according to one embodiment of the present invention.
Figure 3B:
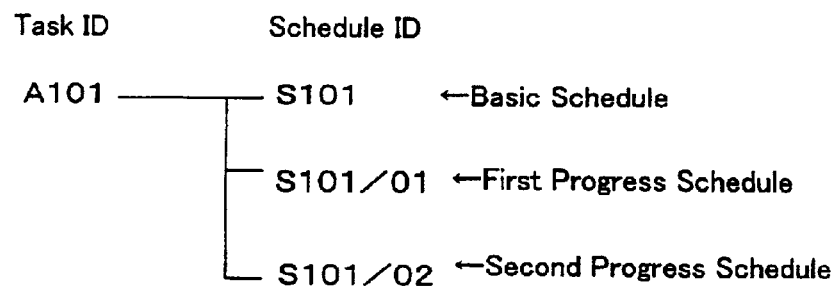

For a better understanding of the invention, one example of a code scheme used in the schedule management system will be described with reference to FIGS. 3A and 3B. As shown in FIG. 3A, a project ID identifies a project which the company X carries out. "A100" is defined in the present example.

A task ID identifies respective tasks into which work for the project is divided. In the present example, each task is expressed as "Axxx" where "xxx" is a serial number beginning with the numerical value 101. Each task ID may be associated with a name of the contractor who carries out the task, a contractor code of the contractor, a part number of the part handled by the task, and a name of the factory where the task is carried out. The contractor code may be the same as the "user ID" of the contractor.

Alternatively, the task ID may be defined in such a manner related tasks could be found. For example, "A100" through "A199" are used for one set of related tasks and "A200" through "A299" are used for another set of related tasks.

An event ID identifies respective events included in each task. The event ID is expressed as "En", where "n" is an integer. An event indicates a processing stage where the task is carried out. The progress of the task is determined for each event.

One project includes one or more tasks while one task includes one or more events. Therefore, as can be seen from FIG. 3A, one project ID is associated with one or more task IDs while each task ID is associated with one or more event IDs.

A schedule ID will be described with reference to FIG. 3B. The schedule ID identifies respective schedules. A basic schedule and progress schedule(s) are created for each task.

Before the project starts, the basic schedule is created by the company X. A first progress schedule is a schedule adjusted and agreed between a contractor and the company X based on the basic schedule. The project starts in accordance with the first progress schedule. After the project starts, progress data received from the contractor is recorded in the first progress schedule.

When a change to the first progress schedule occurs due to design changes or the like, a second progress schedule is created based on the first progress schedule. The progress data recorded in the first progress schedule is copied to the second progress schedule. Thus, a progress schedule having a new schedule ID is created when a change to the current schedule arises.

The basic schedule is indicated by a code "Sxxx" where "xxx" is the same as the numerical value included in the corresponding task ID. The progress schedule is indicated by "Sxxx/n" where "n" is a serial number beginning with "01." For example, a schedule ID in which "n" is "01" represents a first progress schedule while a schedule ID in which "n" is "02" represents a second progress schedule.

The code scheme described above is one example and any other code scheme may be used in another embodiment.

Referring to FIG. 2 again, a general configuration of the schedule management system according to the embodiment will be described. As described above, the personal computer of the contractor 1 includes a browser 2 for communication through the Internet. The contractor 1 can access business pages of the company X via the browser 2.

The public Web server 22 comprises a common schedule database (hereinafter a database will be referred to as a DB) 26, an external form file 27, and an input DB 25. The common schedule DB 26 includes basic schedules and progress schedules transferred from the internal server 33 of company X. The external form file 27 includes predetermined input forms allowing the contractor 1 to enter data through the browser 2. The input DB 25 temporarily stores data received from the browser 2.

Form pages included in the external form file 27 are created as HTML documents. Data entered in the form page is transferred as MIME (Multipurpose Internet Mail Extensions) data to a CGI (Common Gateway Interface) program provided in the public Web server 22. The CGI program, which provides a standard interface between a client and a server, stores the received data in the input DB 25.

The internal server 33 of the company X comprises a basic schedule DB 41, a project schedule DB 43, a progress data receipt DB 42, and an internal form file 44. Alternatively, the basic schedule DB 41 and project schedule DB 43 may be combined into a single database. The internal form file 44 includes predetermined input forms allowing staffers of the company X to enter data for editing a schedule. The form pages may be created as HTML documents. The other databases will be discussed with reference to FIGS. 4 through 9.

FIG. 4A shows an example of a data structure of the basic schedule DB 41 which includes basic schedules. A basic schedule is created for each task. As shown in FIG. 4A, each record includes fields for Schedule ID, Lock Flag, Project ID, Task ID, Contractor ID, Part No., Contractor Name, Factory Name, Basic Scheduled Date, Basic Target Quality, Staffers for a name of a staff member who creates the basic schedule, Update Date for the date and time on which the basic schedule was last updated, Budget, Promotion Dept., Management Dept., and Design Dept.

A lock flag included in the Lock Flag field indicates whether the basic schedule is locked. The term "locked" means that the basic schedule is frozen and cannot be changed. In the example, if the value of the lock flag is one, it means that the basic schedule is locked. If the value is zero, it means that a change to the basic schedule is allowable. The initial value of the lock flag is zero.

FIG. 4B shows the "Basic Scheduled Date" field in more detail. The Basic Scheduled Date field includes one or more groups of event fields. Each event field group includes fields for Event ID and Scheduled Completion Date. There are as many event field groups as the number of events included in the task. The Scheduled Completion Date field includes the due date on which the event is to be completed.

FIG. 4C shows the "Basic Target Quality" field in more detail. The Basic Target Quality field includes one or more groups of event fields. Each event field group includes fields for Event ID and Target Quality Code. There are as many event field groups as the number of events included in the task. The target quality code indicates an index of the quality to be achieved in the event. In the example, the Target Quality field includes a quality code assigned in accordance with predetermined quality criteria as shown in FIG. 5.

FIG. 4D shows the "Budget" field in more detail. A first cost field includes the initial budget for carrying out the task. Whenever a new budget is established, it is stored in the second cost field, . . . , and n-th cost field serially.

Each of the Promotion Dept. field, Management Dept. field, and Design Dept. field includes fields for Staffers, Comment, and Update Date shown in FIG. 4E. When the staffers of the respective departments approve the basic schedule, data as to the approval operation is stored in the fields.

FIG. 6A shows an example of a data structure of the progress data receipt DB 42 which includes progress data received from the contractor 1. As shown in FIG. 6A, each record includes fields for Schedule ID, Project ID, Task ID, Contractor ID, Part No., Contractor Name, Factory Name, Achieved Date, Achieved Quality, Achieved Cost, Staffers, and Update Date.

FIG. 6B shows the "Achieved Date" field in more detail. The field includes one or more groups of event fields. There are as many event field groups as the number of events included in progress data received from the contractor. Each event field group includes fields for Event ID and Achieved Completion Date. The Achieved Completion Date field includes the date on which the event has been completed. The example shown in FIG. 6B shows that progress data for two events has been received from the contractor.

FIG. 6C shows the "Achieved Quality" field in more detail. The field includes one or more groups of event fields. There are as many event field groups as the number of events included in progress data received from the contractor. Each event field group includes fields for Event ID and Achieved Quality Code. The Achieved Quality Code field includes a quality code corresponding to the quality which has been achieved in the event, the quality code being specified in accordance with predetermined quality criteria as shown in FIG. 5.

FIG. 6D shows the "Achieved Cost" field in more detail. The field includes actual cost incurred in carrying out the task.

FIG. 7A shows an example of a data structure of the project schedule DB 43 which includes progress schedules and corresponding progress data for each task. Each project schedule record includes fields for Schedule ID, Lock Flag, Project ID, Task ID, Contractor ID, Part No., Contractor Name, and Factory Name as well as a group of progress schedule fields, a group of progress data fields, and a group of indicator fields.

A lock flag included in the Lock Flag field indicates whether the progress schedule is locked. The term "locked" means that the progress schedule is frozen. Progress data can not be recorded in the locked progress schedule. In the example, if the lock flag is one, it means that the progress schedule is locked. If the flag is zero, it means that the schedule is currently available. The initial value of the lock flag is zero.

Whenever a new progress schedule is created for a task and then is used as the current schedule, the value of the lock flag of the previous schedule is set to one. Thus, the progress data of the task is always recorded in the current schedule.

The progress schedule field group has a similar data structure to that of the basic schedule record shown in FIG. 4A. A Scheduled Date field has the same data structure as the Basic Scheduled Date field shown in FIG. 4B. It includes one or more groups of event fields, each of which includes fields for Event ID and Scheduled Completion Date. A Target Quality field has the same data structure as the Basic Target Quality field shown in FIG. 4C. The Target Quality field has one or more groups of event fields, each of which includes fields for Event ID and Target Quality Code.

The progress data field group has a similar data structure to that of the progress data record shown in FIG. 6A. The number of event field groups included in the progress data field group shown in FIG. 7A is equal to the number of events included in the task.

The indicator field group includes fields for Date Indicator and Quality Indicator. FIG. 7B shows a data structure of the Date Indicator field. FIG. 7C shows a data structure of the Quality Indicator field. Each of the Date and Quality Indicator fields includes one or more groups of event fields, each of which has fields for Event ID and Indicator Value. There are as many event field groups as the number of events included in the task.

FIG. 8 shows an example of a value included in the Indicator Value field. The value "00" indicates an initial value. The value "10" indicates that the schedule defined in the current schedule has been met. In this case, a green lamp is displayed on the screen as described below. The value "01" indicates that the progress of the event is behind the current schedule. In this case, a red lamp is displayed on the screen. The value "11" indicates that progress data of the event has not been obtained from the contractor 1 for a predetermined period (e.g., seven days) after the date of the scheduled completion date according to the current schedule. In this case, a bomb mark is displayed on the screen. The period can be specified arbitrarily depending on the cycle of monitoring the schedule.

FIGS. 9A and 9B show one example of history of project schedule records. It is assumed that the project schedule DB 43 includes a first progress schedule S101/01 and second progress schedule S101/02 for a task A101.

FIG. 9A shows one example as to the first progress schedule S101/01. The first progress schedule field group includes a scheduled completion date and target quality code for each of events E1 and E2. It further includes an achieved completion date and achieved quality code for the event E1. The date indicator field for the event E1 has the value of "10" since the achieved completion date "000601" is earlier than the scheduled completion date "000606" of the event E1. The quality indicator field for the event E1 has the value of "10" since the achieved quality code "T1" is the same as the target quality code of the event E1.

It is assumed that a second progress schedule is created because a change to the first progress schedule shown in FIG. 9A arises. When the second progress schedule is created, the value of the Lock Flag field of the first progress schedule is set to one shown in FIG. 9A. The values of the Achieved Date and Achieved Quality fields for the event E1 of the first progress schedule are copied to the corresponding fields for the second progress schedule. It is assumed that, after that, progress data for the event E2 is recorded in the progress data field group of the second progress schedule. As shown FIG. 913, the date indicator value for the event E2 is set to "01" since the achieved completion date "001010" is later than the scheduled completion date "001006" of the event E2. The quality indicator value is set to "11" since the achieved quality for the event E2 has not been obtained. Thus, the history of progress schedules can be viewed.

Operation of the schedule management system according to one embodiment of the present invention will be described with reference to FIG. 2 and FIGS. 10 to 24.

Creation of Basic Schedule

Before a project starts, staffers 32 in the company X (FIG. 1) create a basic schedule for each of tasks assigned to a contractor and store it in the basic schedule DB 41. The basic schedule may be created based, for example, on a schedule created in the past. The staffers can choose the past schedule for a similar task and create the basic schedule taking a period, quality, cost, etc. of the past schedule into account. The staffers may also take the past progress of the contractor into account.

Figure 11:
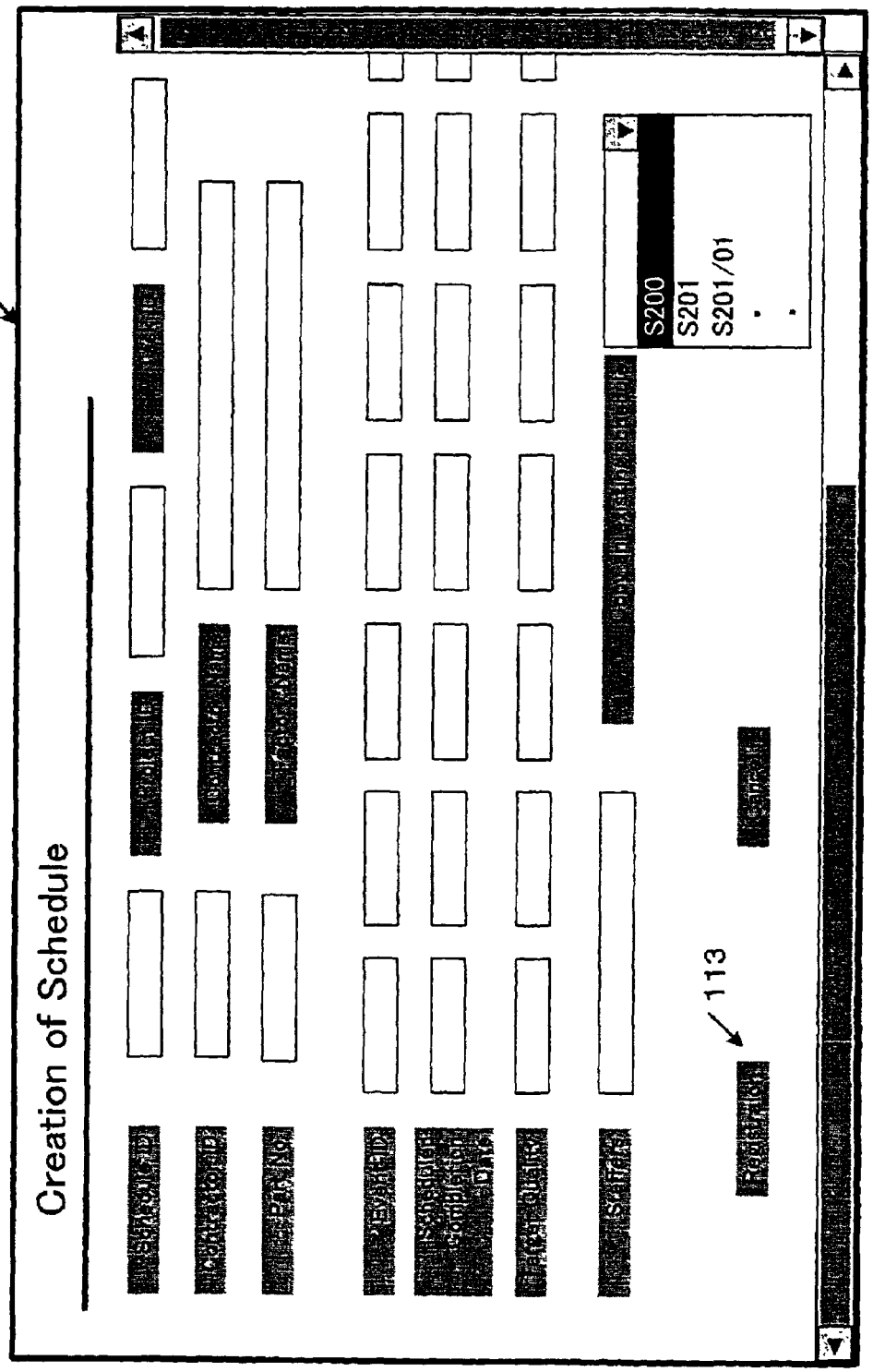
FIG. 11 is a diagram showing an example of a Schedule Creation screen provided to a managing party according to one embodiment of the present invention.

In response to a request for creating a schedule from the staffers, a schedule editing part 45 (FIG. 2) extracts a Schedule Creation screen from the internal form file 44 and provides it to the staffers. An example of the Creation screen is shown in FIG. 11. A screen 110 includes input fields for Schedule ID, Project ID, Task ID, Contractor ID, Event ID, Scheduled Completion Date, Target Quality, and other items. The staffers enter a new schedule ID in the Schedule ID field and enter schedule data in the other input fields.

In response to a click of the Registration button 113, the schedule editing part 45 receives the data entered in the screen 110. The schedule editing part 45 checks whether the ID entered in the Schedule ID field is new. If the entered ID is being used, the schedule editing part 45 displays an error message, preventing overlap among schedule IDs. If it is determined that the entered ID is new, the schedule editing part 45 creates a new basic schedule record to set the received data in the corresponding fields of the record.

Entering data in all the fields of the screen 110 imposes a heavy load on the staffers. The staffers may create a new basic schedule by copying an existing schedule. In this case, the staffers enter a new schedule ID in the Schedule ID field and enter an existing schedule ID in the "Copy an existing schedule" field. In response to a click of the registration button 113, the schedule editing part 45 creates a new basic schedule record for the entered new schedule ID. The editing part 45 copies data of the basic schedule record for the entered existing schedule ID to the new basic schedule record, except at least values included in the Schedule ID and Lock Flag fields. Thus, the new basic schedule record in which the data of the existing basic schedule is copied is stored in the basic schedule DB 41. The new basic schedule can be updated via an Update screen (FIG. 13), which is described below.

Figure 12:
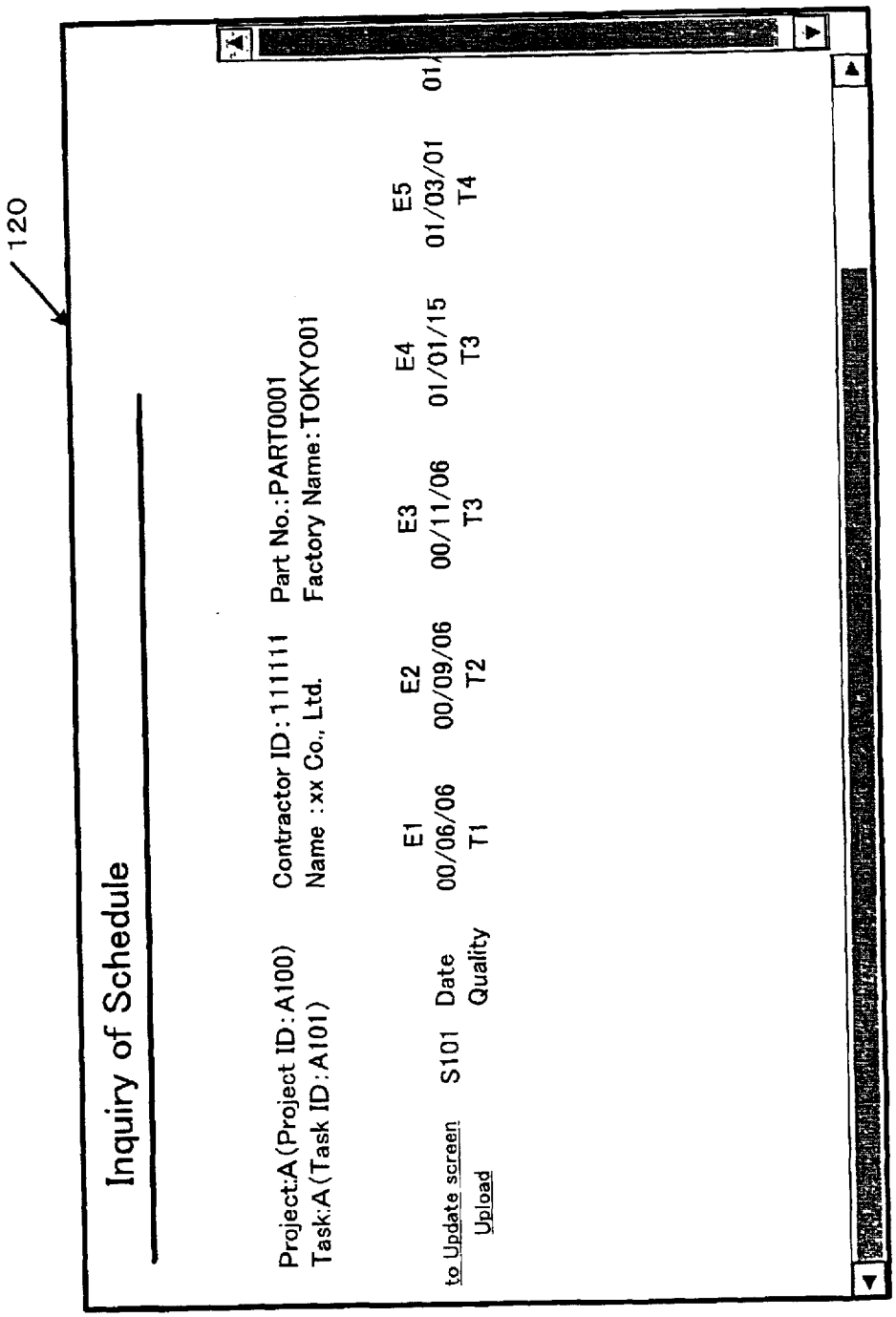
FIG. 12 is a diagram showing an example of a Schedule Inquiry screen provided to a managing party according to one embodiment of the present invention.

The schedule editing part 45 also provides a Schedule Inquiry screen. Staffers can view the basic schedule created as described above via the Inquiry screen. An example of the Inquiry screen is shown in FIG. 12. The contents of the basic schedule S101 are displayed on a screen 120.

When "to Update screen" displayed next to a schedule ID "S101" is clicked, the schedule editing part 45 checks the value included in the Lock Flag field of the schedule having the schedule ID of "S101". If the lock flag value is zero, the schedule editing part 45 extracts a Schedule Update screen from the internal form file 44 and displays it. The staffers can make a change to the schedule on the Update screen. If the lock flag value is one, an error message notifying the staffers that a change to the schedule is not allowable.

Figure 13:
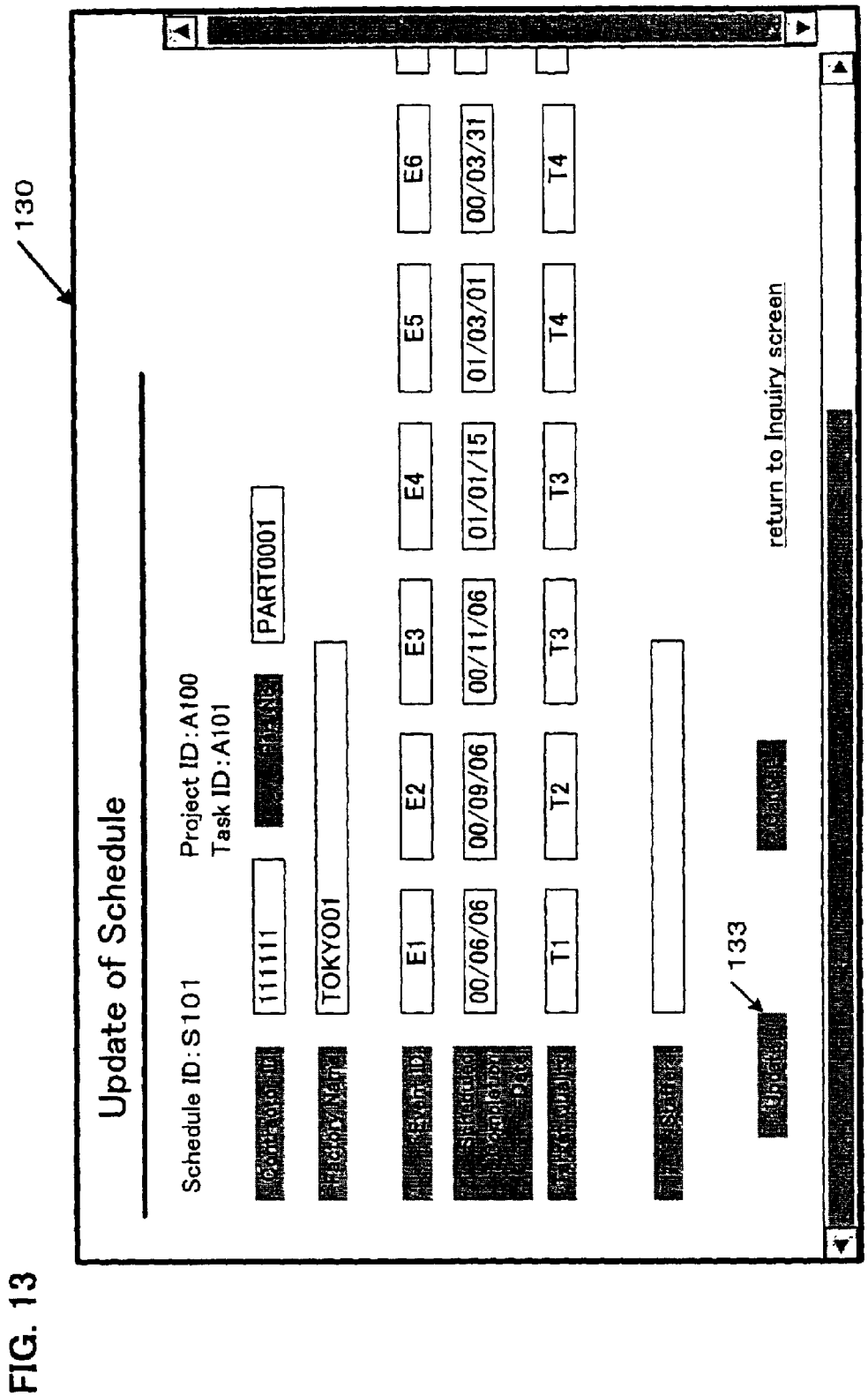
FIG. 13 is a diagram showing an example of a Schedule Update screen provided to a managing side according to one embodiment of the present invention.

An example of the Update screen is shown in FIG. 13. As shown in a screen 130, the schedule editing part 45 can display the screen with fields being filled with data of the schedule. Staffers can overwrite the value shown in each of fields to be changed. When an Update button 133 is clicked, the schedule editing part 45 updates the basic schedule record stored in the basic schedule DB 41 with the data entered in the screen 130.

Referring to FIG. 12 again, when the creation of the basic schedule has been completed, staffers click "Upload" on the Inquiry screen 120. In response to this, the schedule editing part 45 transfers the basic schedule to the common schedule DB 26. The transfer means may be implemented by, for example, a file transfer using a File Transfer Protocol (FTP). Alternatively, a transfer using a Hyper Text Transfer Protocol (HTTP) may be used. The editing part 45 sets the value of one in the Lock Flag field of the basic schedule record. Thus, the basic schedule is locked and cannot be changed thereafter.

Alternatively, the transfer of the basic schedule to the common schedule DB 26 may be automatically activated. In one embodiment, when the basic scheduled has been updated, the transfer is automatically activated. In another embodiment, a value of the Update Date filed of the basic schedule record included in the common schedule DB 26 is compared with a value of the Update Date field of the basic schedule record included in the project schedule DB 43. If the former value does not match the latter value, the transfer means is activated.

Creation of Progress Schedule

A progress schedule is created in a manner similar to the basic schedule. Staffers 32 in the company X can create a new progress schedule via the Creation screen 110 shown in FIG. 11. A first progress schedule is created based on the basic schedule before the project starts. A second or later progress schedule is created when a change to the current schedule arises due to, for example, design changes after the project starts. The creation of a progress schedule is carried out under an agreement between contractors 1 and the company X.

For example, to create a first progress schedule, staffers enter "S101/01" in the Schedule ID field, and enter the basic schedule ID "S101" in the "Copy an existing schedule" field on the screen 110. When the Registration button 113 is clicked, the schedule editing part 45 creates a new project schedule record having the schedule ID of "S101/01". The schedule editing part 45 copies data of the basic schedule S101 to the new project schedule record, which is then stored in the project schedule DB 43.

When the first progress schedule has been created, staffers click "Upload" on the screen 120. In response to this, the editing part 45 sets the value of one in the Lock Flag field of the basic schedule record to freeze the basic schedule. The schedule editing part 45 transfers the project schedule record of the first progress schedule from the project schedule DB 43 to the common schedule DB 26. After that, the first progress schedule is used as the current schedule.

After the project starts, it is assumed that a change to the first progress schedule arises. To create a second progress schedule, staffers enter "S101/02" in the Schedule ID field, and enter the first progress schedule ID "S101/01" in the "Copy an existing schedule" field. When the Registration button 113 is clicked, the schedule editing part 45 creates a new project schedule record having the schedule ID of "S101/02". The schedule editing part 45 copies data of the first progress schedule to the new project schedule record, which is then stored in the project schedule DB 43.

Alternatively, when data of an existing schedule is copied to a new created project schedule record, the schedule editing part 45 may automatically assign a new schedule ID to the new project schedule record. As described above, staffers can update the new progress schedule via the Update screen 130 shown in FIG. 13. The schedule editing part 45 updates the project schedule record with data entered in the screen 130. The staffers can view the new progress schedule on the Inquiry screen 120 shown in FIG. 12.

After the second progress schedule has been created, staffers click "Upload" on the screen 120. In response to this, the editing part 45 sets the value of one in the Lock Flag field included in the project schedule record of the first progress schedule to freeze it. The schedule editing part 45 transfers the project schedule record of the second progress schedule from the project schedule DB 43 to the common schedule DB 26. After that, the second progress schedule is used as the current schedule.

FIG. 14 shows an example of the Inquiry screen when the second progress schedule S101/02 is created and transferred to the common schedule DB 26 and the first progress schedule S101/01 has been locked. When the schedule editing part 45 displays the Inquiry screen, it checks the value included in the Lock Flag field. If the value is one, a "lock" mark 141 is displayed next to the schedule ID.

A locked schedule cannot be changed. Therefore, "to Update screen" displayed next to the lock mark is disabled. When the disabled "to Update screen" is clicked, an error message may be displayed, thereby preventing an access to the Update screen (FIG. 13).

Modification to Schedule by Contractors

Figure 15:
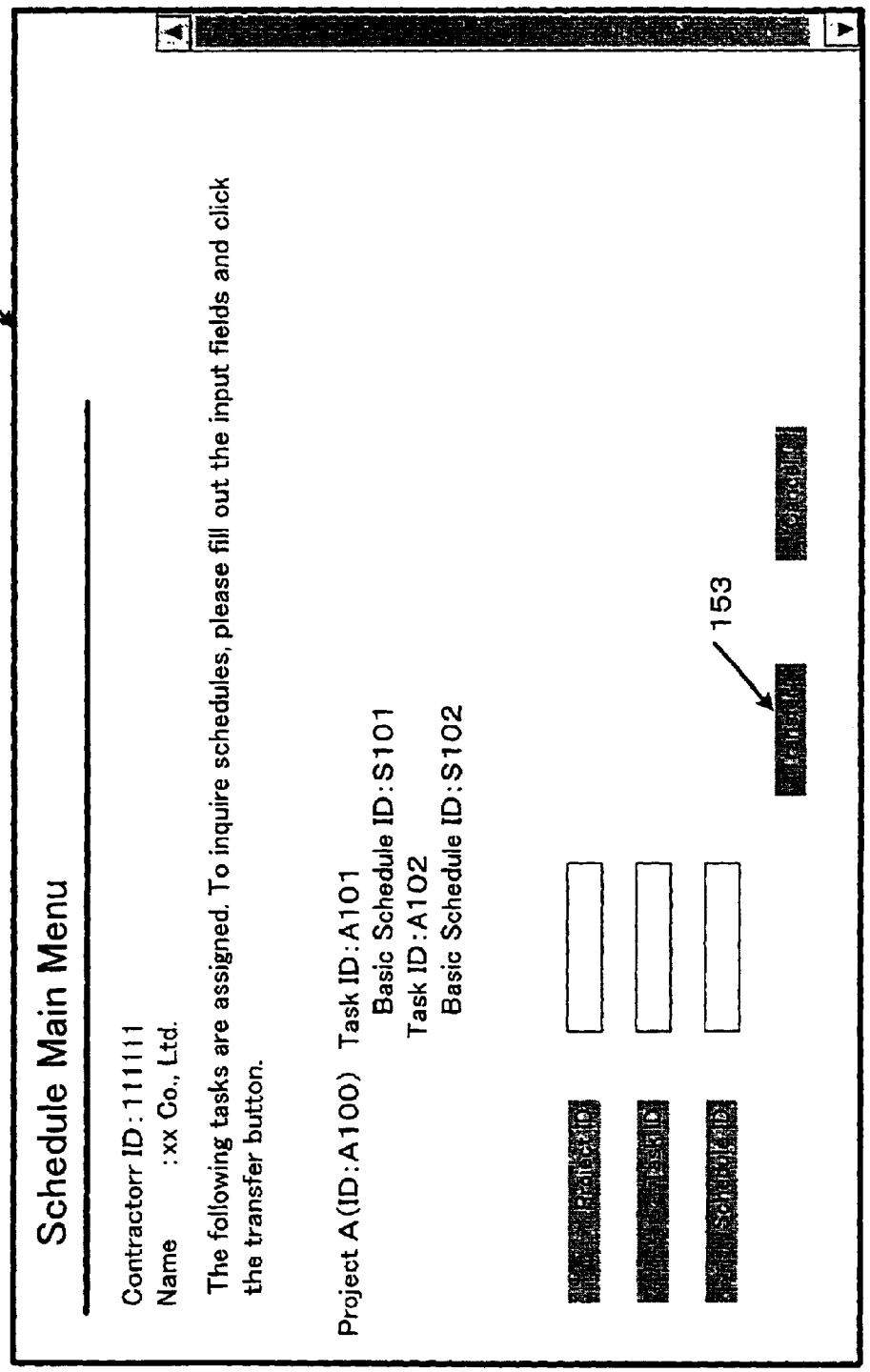
FIG. 15 is a diagram showing an example of a Schedule Main Menu screen provided to a managed party according to one embodiment of the present invention.

Referring to FIG. 2 again, when the browser 2 of the contractor 1 requests an access to a Schedule Main Menu page, a display controller 24 extracts project IDs, task IDs, and schedule IDs relevant to the contractor 1 from the common schedule DB 26 and transfers them to the browser 2. FIG. 15 shows an example of the menu page.

The contractor 1 can enter any of project IDs, task IDs, and schedule IDs in respective input fields. For example, when the contractor 1 enters "A100" in the Project ID field and clicks a Transfer button 153, all the basic schedules for the project having the Project ID of "A100" are displayed. When the contractor 1 enters "S101" in the Schedule ID field and clicks the Transfer button 153, only basic schedule "S101" is displayed. More than one ID may be entered in respective fields.

In the example of FIG. 15, it is assumed that "A100" is entered in the Project ID field. When the Transfer button 153 is clicked, data entered in the input fields of the screen 150 is transferred together with the contractor ID to the public Web server 22. The display controller 24 checks whether the received contractor ID matches the value included in the Contractor ID field of the basic schedule record, thereby preventing the contractor 1 from viewing schedules of other contractors. If so, the display controller 24 extracts data of the basic schedules "S101" and "S102" associated with the contractor having the Contractor ID of "111111" from the common schedule DB 26, and transfers it to the browser 2.

FIG. 16 shows an example of the Schedule Inquiry screen presented to the contractor 1. The screen 160 shows two basic schedules for two tasks "A101" and "A102" which belong to project "A100" and which have been assigned to the contractor. For example, task "A101" is a task of manufacturing parts each having a part number of "PART0001" at factory "TOKYO01." The screen 160 also displays the scheduled completion dates and target quality codes of events E1, E2, . . . included in the tasks.

Figure 17:
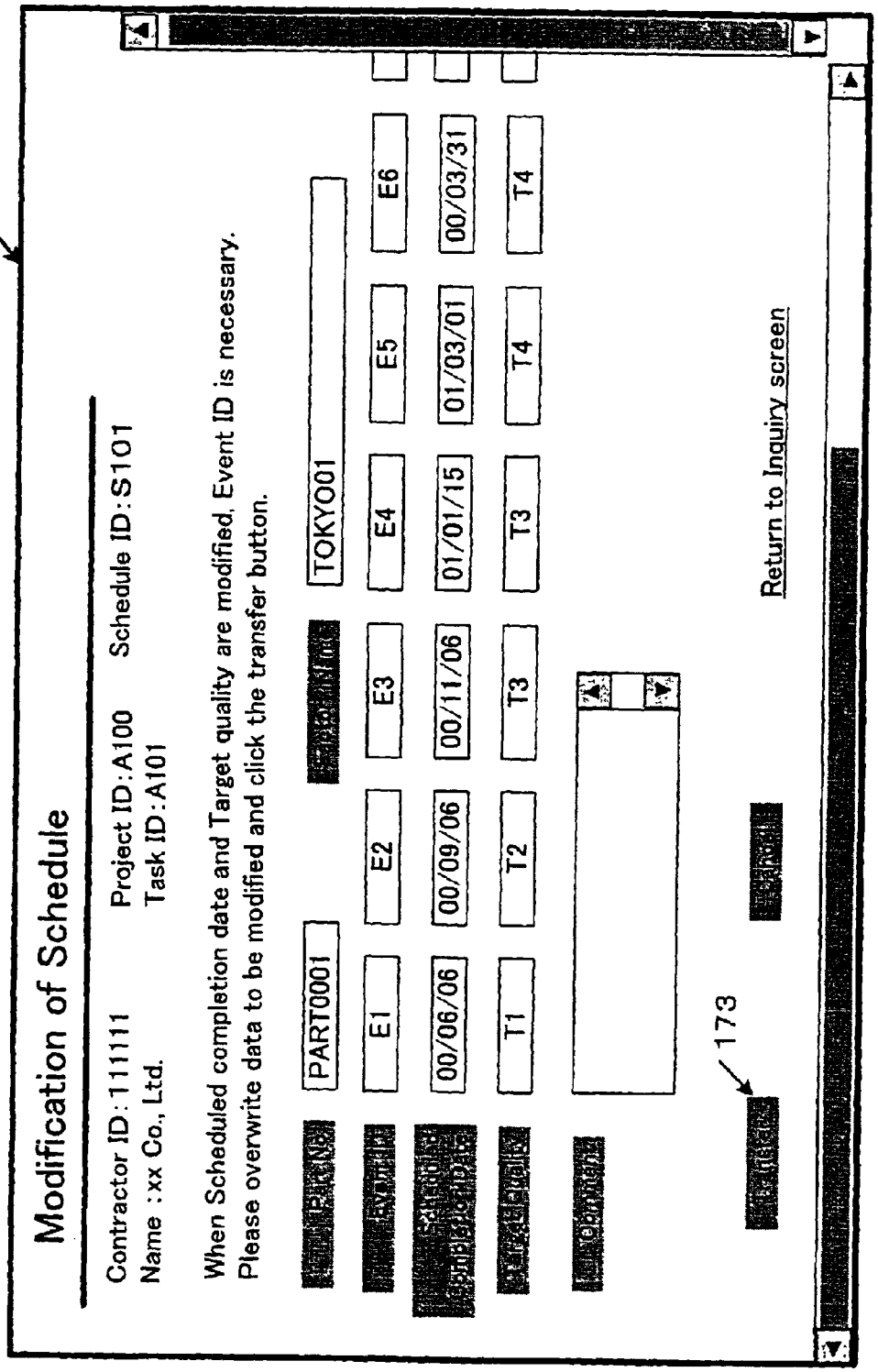
FIG. 17 is a diagram showing an example of a Schedule Modification screen provided to a managed party according to one embodiment of the present invention.

When "to Modification screen." is clicked, the display controller 24 extracts a "Modification screen" from the external form file 27 and transfers it to the browser 2. FIG. 17 shows an example of the Modification screen. As shown in a screen 170, the display controller 24 displays the screen with fields being filled with data of the selected basic schedule.

The contractor 1 can overwrite data shown in each of fields to be modified on the screen 170. Furthermore, the contractor 1 can describe a comment (e.g., reason for a modification) in a Comment field. When a Transfer button 173 is clicked, data entered in the screen 170 is transferred to the public Web server 22 through the Internet and is stored in the input DB 25. An input data extraction part 23 extracts the modification data stored in the input DB 25 and transfers it to the internal server 33.

Alternatively, only the data to be modified may be entered in the screen 170. In this case, the input data extraction part 23 extracts the modification data from the input DB 25, and modifies a corresponding basic schedule record included in the common schedule DB 26 with the modification data. The input data extraction part 23 transfers the modified record to the internal server 33.

The internal server 33 receives the modification data. The modification data may be stored temporarily in the progress data receipt DB 42. Staffers in the company X examine the modification data via the Inquiry screen shown in FIG. 12, and create a first progress schedule in the above-described manner. Thus, a progress schedule agreed between the company X and the contractor is created. The reliability of the schedule is improved. Alternatively, modification data may be received from the contractor 1 by e-mail.

The above-described manner for modifying a basic schedule is also applied to a progress schedule. The contractor 1 can view a progress schedule by accessing the Inquiry screen (FIG. 16) via the Main Menu (FIG. 15). The contractor 1 can transfer modification data via the Modification screen (FIG. 17). Staffers in the company X examine the modification data via the Inquiry screen shown in FIG. 14, and create a new progress schedule in the above-described manner.

Recording of Progress Data in Schedule

Figure 18:
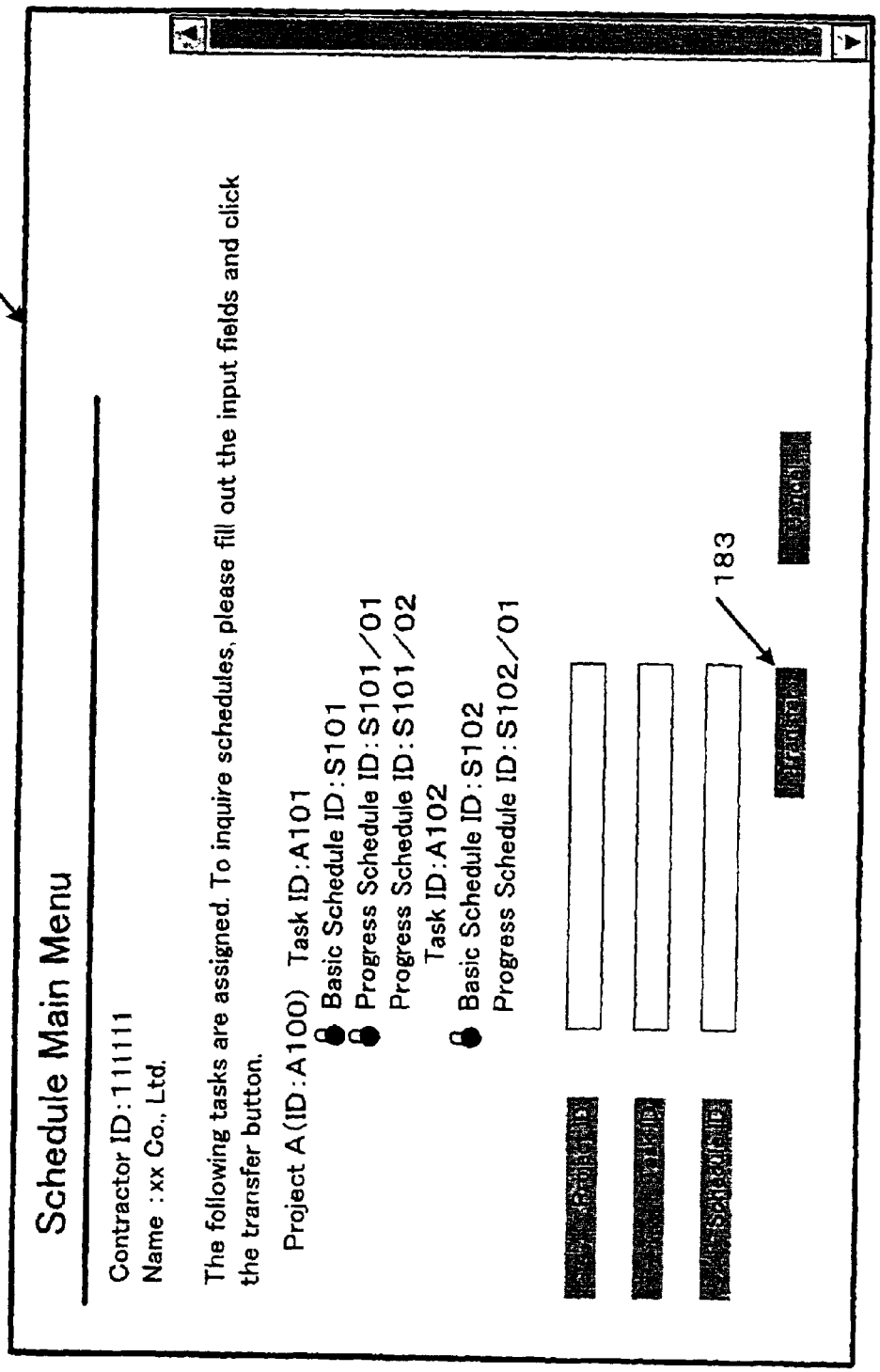
FIG. 18 is a diagram showing another example of the Schedule Main Menu screen provided to a managed party according to one embodiment of the present invention.

The contractor 1 accesses the Schedule Main Menu page to report to the company X the progress for each event included in assigned tasks. A screen 180 shown in FIG. 18 is another example of the main menu page shown in FIG. 15. The screen 180 shows tasks "A101" and "A102" of the project "A100". As to task "A101", basic schedule "S101", first progress schedule "S101/01", and second progress schedule "S101/02" are shown, the basic schedule and first progress schedule being locked. As to task "A102", basic schedule "S102" and first progress schedule "S102/01" are shown, the basic schedule being locked. As described with reference to FIG. 15, the contractor 1 can enter any of project IDs, task IDs, and/or schedule IDs in respective fields and click a Transfer button 183 to view desired schedules. More than one ID may be entered in respective fields.

For example, the contractor 1 enters "A100" in the Project ID field and clicks the Transfer button 183. In response to this, the display controller 24 determines task IDs of "A101" and "A102" assigned to the contractor "111111" in the project "A100", extracts schedules associated with the two tasks, and transfers them to the browser 2. FIG. 19 shows another example of the Inquiry screen which is shown in FIG. 16.

A screen 190 shows basic schedule "S101", first progress schedule "S101/01", and second progress schedule "S101/02" associated with the task "A101". When the contractor 1 clicks "to Progress Data Input screen", the display controller 24 extracts a Progress Data Input screen from the external form file 27 and transfers it to the browser 2.

Figure 20:
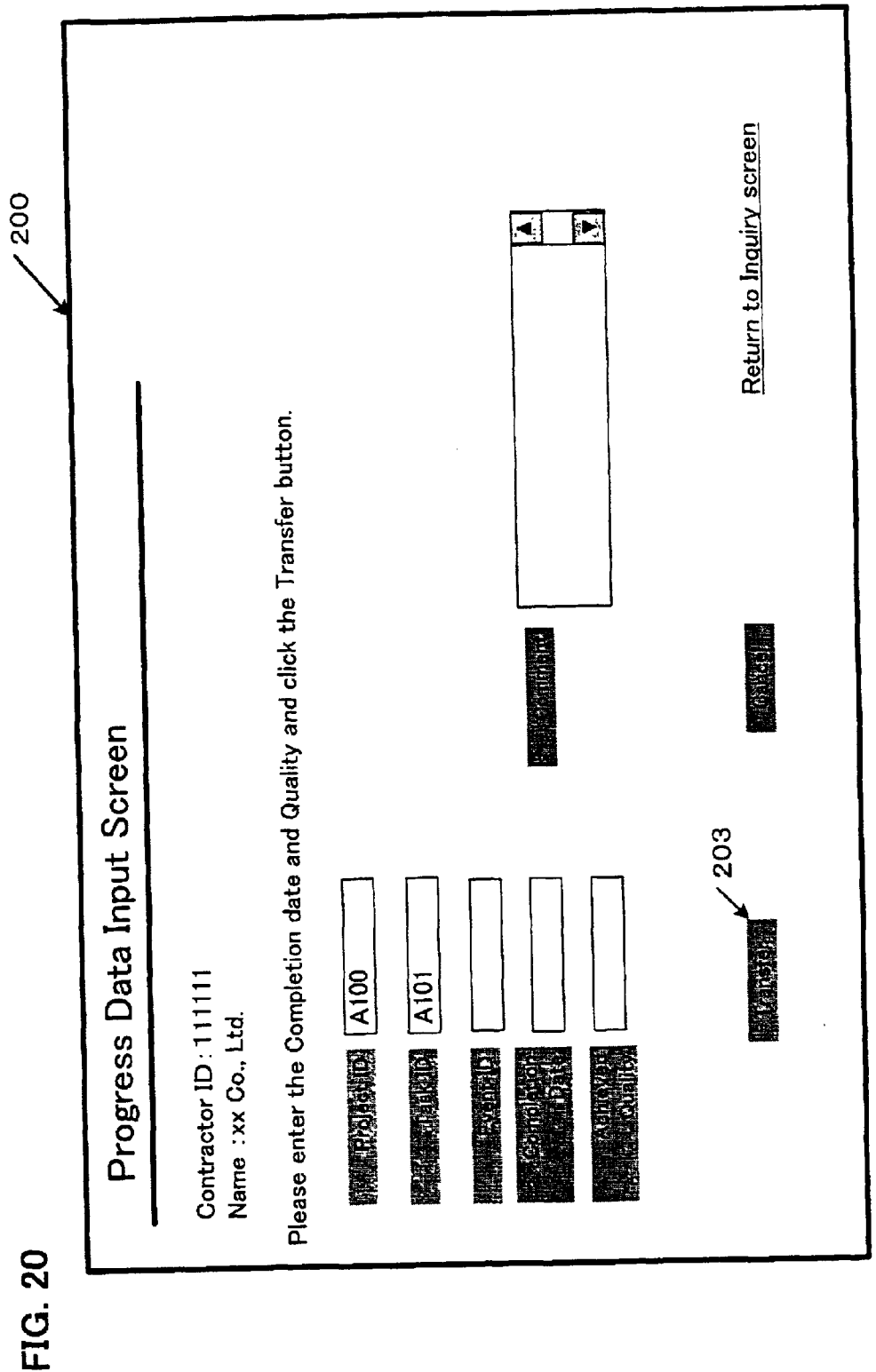
FIG. 20 is a diagram showing an example of a Progress Data Input screen provided to a managed party according to one embodiment of the present invention.
Figure 21:
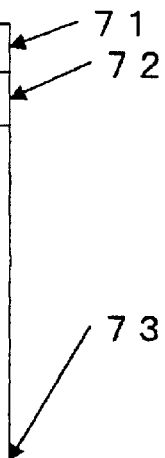
FIG. 21 is a diagram showing an example of an e-mail template for reporting progress according to one embodiment of the present invention.

FIG. 20 shows an example of the Progress Data Input screen. The contractor 1 enters an event ID of progress data to be reported to the company X in the Event ID field. The contractor 1 further enters the completion date on which the event was completed in the Completion Date field, a quality code corresponding to the quality achieved in the event in the Achieved Quality field. The contractor 1 can describe a comment (e.g., reason for a delay) in a Comment field. When the contractor 1 clicks a Transfer button 203, the progress data entered in the Progress Data Input screen 200 is transferred together with project ID, task ID, and contractor ID, etc. to the public Web server 22 and stored in the input DB 25.

Various methods may be used to enter the progress data. Alternatively, in response to a selection of an event ID displayed on the Inquiry screen, the Progress Data Input screen may be displayed. In this case, it may be arranged that the present date may be shown automatically in the Completion Date field.

In another embodiment, the contractor transfers the progress data by e-mail having a predetermined format. In this case, a "Transfer progress data" button is provided on, for example, the Inquiry screen. When the button is clicked, the display controller 24 extracts an e-mail template shown in FIG. 21. The template includes an Address field 71, Subject field 72 and Body field 73. "$" indicates a parameter which is set by the display controller 24. For example, a project ID "A100" will be set in "$project_id." The display controller 24 then displays the e-mail template with all the parameters being replaced with corresponding values. The contractor 1 fills out the underlined portions in the field 73 and transfers the e-mail. The public Web server 22 receives the e-mail and extracts the progress data from the received e-mail to store it in the input DB 25.

When a predetermined amount of progress data is stored in the input DB 25, or when a predetermined period has elapsed, the input data extraction part 23 may extract the progress data from the input DB 25 and transfer it to the internal server 33. Alternatively, when progress data is stored in the input 25, the progress data may be automatically transferred to the internal server 33.

The progress data received from the input data extraction part 23 is stored in the progress data receipt DB 42 provided in the internal server 33. The schedule editing part 45 extracts the progress data from the progress data receipt DB 42 and locates a project schedule record in which the extracted progress data is to be recorded. More particularly, the schedule editing part 45 accesses the project schedule DB 43 and locates a project schedule record in which the project ID is "A100", task ID is "A101", and the lock flag value is zero. Thus, the project schedule record having the progress schedule ID "S101/02" is located. The editing part 45 records the progress data in the progress data field group of the project schedule record.

Then, the schedule editing part 45 compares, for each event, the date included in the Scheduled Date field with the date included in the Achieved Date field. The value of the date indicator is determined based on the comparison result. The editing part 45 also compares, for each event, the quality code included in the Target Quality Code field with the quality code included in the Achieved Quality field. The value of the quality indicator is determined based on the comparison result.

FIG. 10 shows a flowchart of setting an indicator value, which may be activated when the progress data is recorded. Alternatively, the process may be activated at predetermined intervals. Events each having an indicator value of "00" or "11" are extracted in Step 101. The subsequent steps are performed for each of the extracted events.

In Step 102, it is checked whether progress data has been recorded for the event. If so, the scheduled completion date and the achieved completion date are compared (103). If the achieved completion date is the same as or earlier than the scheduled completion date, it means that the event has been carried out according to the schedule. Thus, the indicator value is set to "10" (104) as described with reference to FIG. 8. In Step 103, if the achieved completion date is later than the scheduled completion date, it means that the progress of the event is behind the schedule. Thus, the indicator value is set to "01."

In step 102, if progress data has not been recorded, the process proceeds to step 106. In step 106, it is checked whether a predetermined period has elapsed from the scheduled completion date. If so, it means that progress data has not been obtained for the predetermined period. Thus, the indicator value is set to "11." The period can be defined arbitrarily (e.g., a week).

In step 106, if a predetermined period has not elapsed from the scheduled completion date, the indicator value is set to "00". When the initial value of the indicator is zero, step 108 may be skipped.

The process shown in FIG. 10 is applied to setting of the quality indicator value. If the achieved quality code is the same as or higher than the target quality code, the indicator value is set to "10". If the achieved quality code is lower than the target quality code, the indicator value is set to "01". If progress data as to the quality has not been obtained, the indicator value is set to "11".

The project schedule record in which progress data and an indicator value are set is transferred to the common schedule DB 26, for example in response to a click of "Upload" shown in the Inquiry screen. Alternatively, the transfer may be activated automatically, for example, in response to the setting of the indicator values, or at predetermined intervals. Thus, the contractor 1 can view the latest progress schedule.

Display Format of Schedule

Referring to FIG. 2 again, a schedule display part 46 can display a schedule in various display formats. FIG. 22 shows an example of a typical display format. Three inquiry menus of "Date", "Quality", and "Summary" are provided on the left side of the screen 220, as indicated by a reference number 221.

When "ALL" included in "Date" menu is clicked, the progress data as to the completion date for all the schedules is displayed in a hierarchical format. When "SHORT" is clicked, the progress data is displayed in a simplified format. When "LIST" is clicked, the progress data is displayed in a list format. "ALL", "SHORT" and "LIST" included in "Quality" menu has the same display formats as those of the "Date" menu.

When "ALL" of "Date" menu is clicked, the schedule display part 46 extracts from the basic schedule DB 41 and project schedule DB 43 values included in the fields for Schedule ID, Project ID, Task ID, Contractor ID, Part No., Contractor Name, Factory Name, and Date Indicator of all the basic and project schedule records. The extracted values are displayed in a hierarchical format having project ID, contractor ID, task ID, and schedule ID in this order, as shown in FIG. 22. Displaying in such a tree format makes it easier to keep track of the progress for each task.

For each event, if the value included in the Date Indicator field is "10," a green lamp is displayed, which is indicated by a white circle in FIG. 22. If the indicator value is "01", a red lamp is displayed, which is indicated by a black circle in FIG. 22. If the indicator value is "11", a bomb mark is displayed. If the indicator value is "00", no mark is displayed. Thus, a user can grasp the progress of each event by referring to the mark.

Alternatively, the process of setting an indicator value shown in FIG. 10 may be performed when "ALL" is clicked, not when progress data is recorded as described above. The schedule display part 46 displays an indicator's mark in accordance with the indicator value determined in the process.

When any one of project ID, contractor ID, task ID, schedule ID, and event ID on the screen 220 is clicked, corresponding schedule can be viewed in detail. For example, if a contractor ID is clicked, the schedule display part 46 displays data of the basic and progress schedules associated with the clicked contractor. The inquiry screen shown in FIG. 14 is an example displayed when a contractor ID of "11111"is clicked on the screen 220.

FIG. 23 shows an example of the "SHORT" display format. When "SHORT" included in "Date" menu is clicked, the schedule display part 46 extracts values included in the fields for Schedule ID, Project ID, Task ID, Part No., Factory Name, and Date Indicator of project schedule records, where the value of the Lock Flag field is zero. The extracted values are displayed in a hierarchical format having project ID, task ID, and schedule ID in this order. The progress of each event is indicated by a mark assigned in accordance with the indicator value included in the Date Indicator field, as is the case with the "ALL" format shown in FIG. 22.

As can be seen from a screen 230, according to the "SHORT" format, only the current schedule is displayed. Therefore, more progress schedules are displayed in one page, thereby making it easier to keep track of the overall progress of the project. When any one of a task ID, schedule ID, and event ID is clicked, corresponding schedule may be viewed in detail, as shown in FIG. 14.

Figure 24:
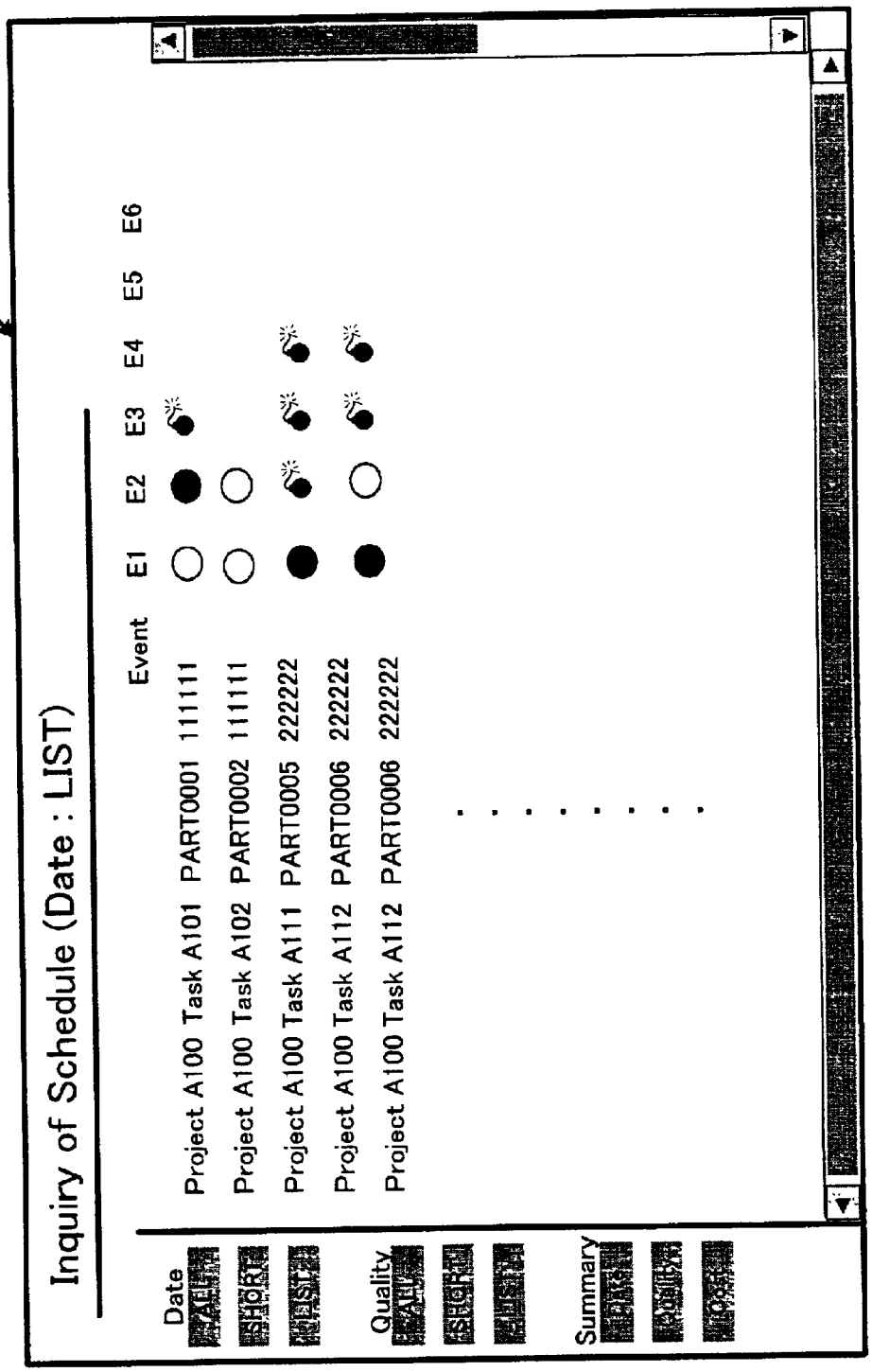
FIG. 24 is a diagram showing another example of the Schedule Inquiry screen provided to a managing party according to one embodiment of the present invention.

FIG. 24 shows an example of the "LIST" display format. When "LIST" is clicked, the schedule display part 46 extracts values included in the fields for Project ID, Task ID, Part No., Contractor ID, and Date Indicator of project schedule records, where the value of the Lock Flag field is zero. The extracted values are listed in the order of project ID, task ID, and part No. The "LIST" display format is also a hierarchical format since displayed items are listed hierarchically.

According to the "LIST" format, the progress for each task is displayed in one row. Therefore, more schedules can be viewed in one page, thereby making it possible to grasp the progress of the entire project at a glance.

Figure 25:
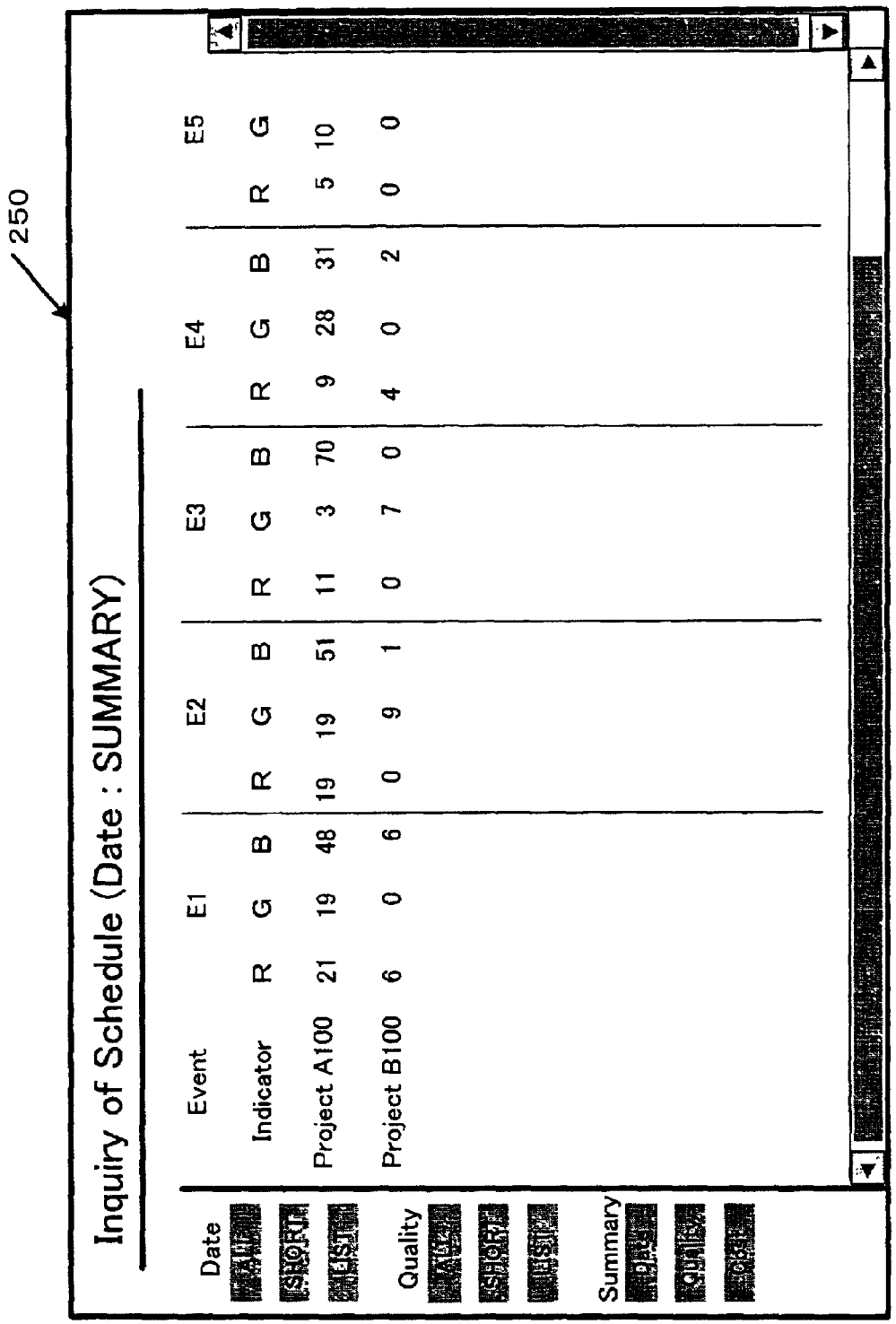
FIG. 25 is a diagram showing another example of the Schedule Inquiry screen provided to a managing party according to one embodiment of the present invention.

FIG. 25 shows an example of the screen displayed when "Date" included in "Summary" menu is clicked. As shown in a screen 250 in FIG. 25, a date summary shows the numbers of "red lamps" (indicated by "R" on the screen), "green lamps" (indicated by "G" on the screen), and "bombs" (indicated by "B" on the screen) for each event. According to the summary format, it is numerically shown whether the entire project is behind or ahead of the schedule.

The items displayed on the Inquiry screen described above are one example. The items to be displayed in each display format can be defined arbitrarily.

In the present example, the project ID is positioned at the top of the hierarchical format and the progress is displayed for each project. However, any item may be positioned at the top of the hierarchical format. For example, a hierarchical format in which the contractor ID is positioned at the top may be used. Alternatively, a hierarchical format arranged in terms of a contractor with a delay in progress or a group of related tasks may be used. It is preferable that a plurality of menus may be provided to allow a user to select a desired hierarchical format. For example, menus for viewing the progress for each contractor and for each project may be provided. When the contractor menu is clicked, the progress is displayed in a hierarchical format in which the contractor ID is at the top position. When the project menu is clicked, the progress is displayed in a hierarchical format in which the project ID is at the top position, as shown in FIGS. 23 to 25.

It is also possible to assign a priority to each task and/or event and to display the progress in order of priority. If the progress of an event given a high priority indicates a delay, an indicator mark (e.g., "!" mark) may be displayed to call attention. Thus, the progress can be handled in accordance with the priority.

In another embodiment, a threshold value is defined for the magnitude of the difference between scheduled data and progress data for each task or event. For example, a threshold value for the completion date may be defined as "3 days." The progress is managed so that the threshold value is not exceeded. If the threshold value is exceeded, a warning indicator may be displayed, or an e-mail message for alerting the contractor may be transferred. Also, if progress data is not received from the contractor after a predetermined period from the scheduled completion date as described above, an e-mail message for a reminder may be transferred automatically, prompting the contractor to report the progress.

The above functional blocks (the input extraction part 23, display controller 24, schedule editing part 45 and schedule display 46) are typically implemented by computer programs stored in any storage such as a magnetic disc, optical disc, and non-volatile memory. Alternatively, the functional blocks may be implemented by any hardware configured to perform functions described above. The above described databases and files may be provided in any storage.

What is claimed is:

1. A schedule management system including an internal server for a managing party and a public web server accessible by one or more managed parties, the internal server and the public web server being connected via a first network, the public web server and managed parties being connected via a second network, the system comprising:
    a schedule table provided on the internal server, the schedule table storing a schedule created by the managing party;
    a common schedule table provided on the public web server, the common schedule table storing the schedule transferred from the internal server via the first network
    enabling means provided on the public web server for enabling the managed parties to refer to the schedule stored in the common schedule table via the second network;
    receiving means provided on the public web server, the receiving means receiving modification data addressed to the public web server from one or more of the managed parties via the second network;
    an input database provided on the public web server for storing the modification data; and
    extracting means provided on the public web server for extracting from the input database the modification data for transfer thereof to the internal server via the first network;
    wherein the internal server is configured to:
        receive the modification data from the public web server;
        modify the schedule stored in the schedule table with the modification data; and
        transfer the modified schedule to the common schedule table,
    wherein the internal server is further configured to reject data addressed to the internal server from the managed parties.

2. The schedule management system of claim 1, wherein the public web server is further configured to provide each of the managed parties with a modification means for generating the modification data;
    wherein the receiving means further receives the modification data entered via the modification means by the managed parties.

3. The schedule management system of claim 2, wherein the public web server is connected to the managed parties through the Internet;
    wherein the modification means include a page for entering the modification data; and
    wherein, in response to a click of a transfer button provided on the page, the modification data entered in the page is transferred to the public web server.

4. The schedule management system of claim 1, wherein the transfer of the schedule to the common schedule table is automatically activated in response to the modification being completed.

5. The schedule management system of claim 1, wherein the public web server is further configured to provide each of the managed parties with a progress input means;
    wherein the receiving means further receives progress data entered via the progress input means by the managed parties;
    wherein the internal server is further configured to:
        receive the progress data from the public web server;
        record the received progress data in the schedule stored in the schedule table; and
        transfer the schedule in which the progress data is recorded to the common schedule table.

6. The schedule management system of claim 5, wherein the transfer of the schedule to the common schedule table is automatically activated in response to the progress data being recorded.

7. The schedule management system of claim 5, wherein the public web server is connected to the managed parties through the Internet;
    wherein the progress input means includes a page for entering the progress data; and
    wherein, in response to a click of a transfer button provided on the page, the progress data entered in the page is transferred to the public web server.

8. The schedule management system of claim 5, wherein the internal server is further configured to compare the progress data with of the progress data in a hierarchical format.

9. The schedule management system of claim 8, wherein the internal server is further configured to provide a page for viewing or editing a schedule in response to a selection of the schedule on the screen where the progress of the schedule is displayed.

10. The schedule management system of claim 5, wherein the internal server is further configured to compare the progress data with the schedule, to assign a mark to the progress data in accordance with the comparison result, and to display the progress by the mark.

11. The schedule management system of claim 1, wherein the public web server is connected to the managed parties through the Internet;
    wherein the public web server is further configured to provide each of the managed parties with a page for inquiring the schedule stored in the common schedule table through the Internet.

12. In a system including an internal server for a managing party and a public web server accessible by one or more managed parties, the internal server and the public web server connected via a first network, the public web server and the managed parties connected via a second network, a method for managing a schedule between the managing party and the one or more managed parties, comprising:
    storing a schedule created by the managing party in a schedule table provided in the internal server;
    storing the schedule transferred from the internal server via the first network in a common schedule table provided in the public web server;

enabling the managed parties to refer to the schedule stored in the common schedule table via the second network;

receiving at the public web server modification data addressed to the public web server from one or more of the managed parties via the second network;

storing the modification data in an input database provided in the public web server;

extracting from the input database the modification data for transfer thereof to the internal server via the first network;

receiving at the internal server the modification data from the public web server;

modifying the schedule stored in the schedule table; and transferring the modified schedule to the common schedule table, wherein the internal server is configured to reject data addressed to the internal server from the managed parties.

13. The method of claim 12, performed using an enabling means provided on the public web server, the method comprising the enabling means enabling the managed parties to submit the schedule modification data.

14. The method of claim 12, wherein the transfer to the common schedule table is automatically activated in response to completion of the modification of the schedule.

15. The method of claim 12, wherein each of the managed parties may submit progress data;

at the public web server, receiving progress data submitted by one or more of the managed parties;

at the internal server, receiving the progress data from the public web server;

recording the received progress data in the schedule stored in the schedule table; and transferring the schedule in which the progress data is recorded to the common schedule table.

16. The method of claim 15, wherein the transfer to the common schedule table is automatically activated in response to recordation of the progress data.

17. The method of claim 15, further comprising displaying progress representative of the progress data in a hierarchical format.

18. The method of claim 17, further comprising providing a page for viewing or editing a schedule in response to a selection of the schedule on the display of progress.

19. The method of claim 15, further comprising comparing the progress data with the schedule;

assigning a mark to the progress data in accordance with the comparison result; and displaying the progress by the mark.

20. The method according to claim 19, comprising providing a page for viewing or editing a schedule in response to a selection of the schedule on the display of progress.

21. The method of claim 12, wherein the managed parties connect to the common schedule table through the Internet.

* * * * *

UNITED STATES PATENT AND TRADEMARK OFFICE
CERTIFICATE OF CORRECTION

PATENT NO. : 6,918,089 B2
DATED : July 12, 2005
INVENTOR(S) : Jiyunji Uchida et al.

It is certified that error appears in the above-identified patent and that said Letters Patent is hereby corrected as shown below:

Column 18,
Line 35, please delete "compare the progress data with of the progress data in a hierarchical format" and insert -- display progress representative of the progress data in a hierarchical format --.

Signed and Sealed this

Twenty-fifth Day of October, 2005

JON W. DUDAS
*Director of the United States Patent and Trademark Office*